United States Patent [19]
Kihara et al.

[11] Patent Number: 6,023,356
[45] Date of Patent: Feb. 8, 2000

[54] IMAGE RECORDING APPARATUS AND METHOD

[75] Inventors: Nobuhiro Kihara; Akira Shirakura, both of Tokyo, Japan

[73] Assignee: Sony Corporation, Japan

[21] Appl. No.: 09/093,913

[22] Filed: Jun. 9, 1998

[30] Foreign Application Priority Data

Jun. 11, 1997 [JP] Japan ................................. 9-154110

[51] Int. Cl.⁷ ................. G03H 1/26; G03H 1/30
[52] U.S. Cl. ................. 359/23; 359/22; 359/25
[58] Field of Search .................. 359/22, 23, 24, 359/25, 28, 10, 34

[56] References Cited

U.S. PATENT DOCUMENTS 4,421,380 12/1983 McGrew .................. 359/23
4,643,515 2/1987 Upatnieks .................. 350/3.67

FOREIGN PATENT DOCUMENTS 0102492 4/1989 Japan .................. 359/23
406175570 6/1994 Japan .................. 359/23

*Primary Examiner*—Cassandra Spyrou
*Assistant Examiner*—Fayez Assaf
*Attorney, Agent, or Firm*—Rader, Fishman & Grauer; Ronald P. Kananen

[57] ABSTRACT

To produce a rainbow-type holographic stereogram, an object beam is focused in the vertical direction with a cylindrical Fresnel lens. On the other hand, according to the edge-lit scheme, a reference beam is applied to a hologram recording medium via a light introduction block. A color holographic stereogram can be produced by utilizing a phenomenon that the color of a reproduction image is varied by moving the cylindrical Fresnel lens by a proper distance in the vertical direction.

14 Claims, 23 Drawing Sheets

FIG.13
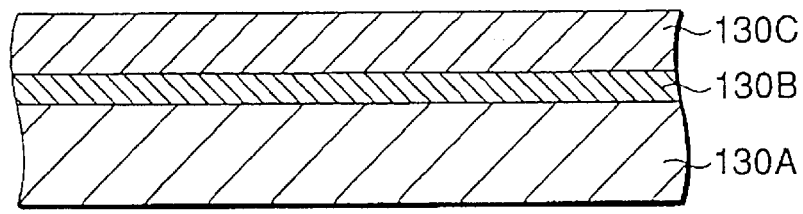
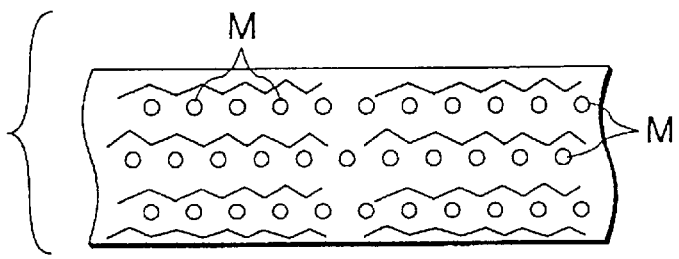
FIG.14A
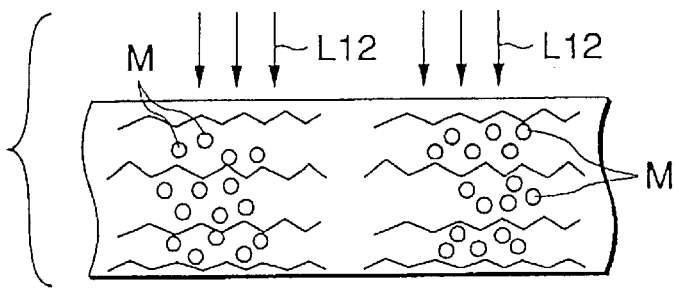
FIG.14B
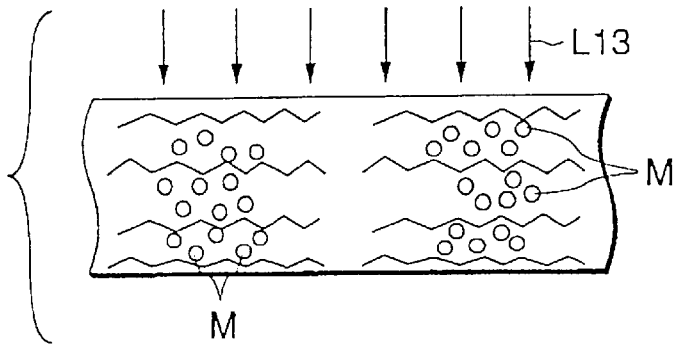
FIG.14C

RECORDING WAVELENGTH $\lambda o$

REPRODUCTION WAVELENGTH $\lambda c$

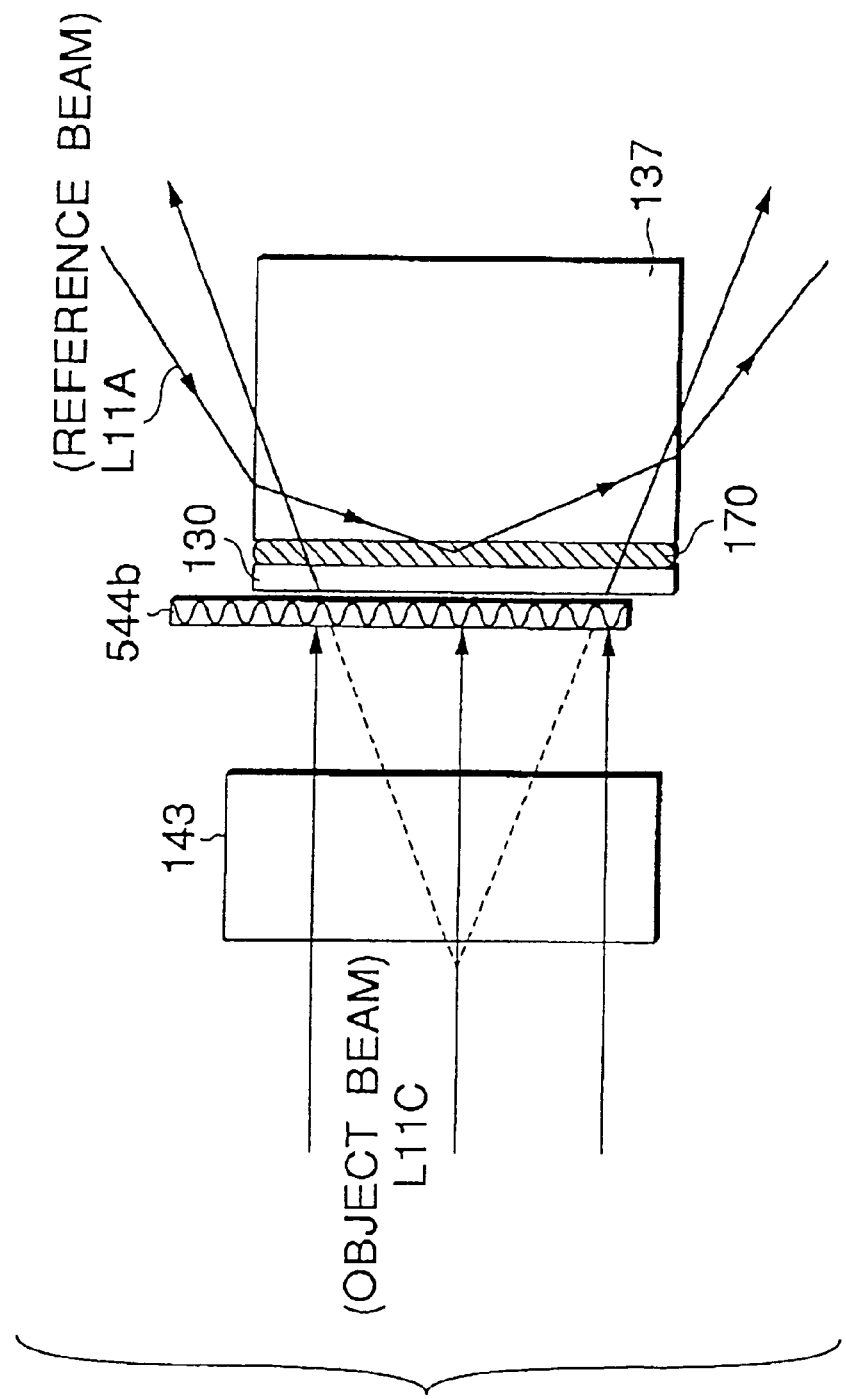

IMAGE RECORDING APPARATUS AND METHOD

BACKGROUND OF THE INVENTION

The present invention relates to an image recording apparatus and method for recording an image on an edge-lit holographic stereogram.

A technique using a holographic stereogram is known as a method for recording a three-dimensional image on a recording medium. A holographic stereogram is produced by sequentially recording, on a single hologram recording medium, original images that are a number of images obtained by sequentially photographing an object from different observation points.

Among various kinds of holographic stereograms that are produced in the above manner, a holographic stereogram having a parallax only in the horizontal direction is produced by sequentially recording, on single hologram recording medium, as rectangular elemental holograms, original images that are a number of images obtained by sequentially photographing an object from different observation points.

For example, as shown in FIG. 1, a plurality of original images 601a–601e obtained by sequentially photographing an object 600 from observation points that are different in the horizontal direction are sequentially recorded on a hologram recording medium 602 in the form of rectangular elemental holograms.

Since pieces of image information obtained by sequential photographing from observation points that are different in the horizontal direction are sequentially recorded in the horizontal direction on a holographic stereogram in the form of elemental holograms, when an observer sees the holographic stereogram through both eyes, two-dimensional images perceived through his right and left eyes are slightly different from each other. As a result, the observer senses a parallax, that is, a three-dimensional image is reproduced according to the principle of stereoscopic vision.

Incidentally, in usual holograms, an illumination light source for reproducing a three-dimensional image is spatially distant from a hologram. Therefore, in usual holograms, a wide space is needed for reproduction and to enable reproduction under the optimum conditions a hologram and an illumination light source should be located so that their positional relationship satisfies given conditions. The same thing applies to a holographic stereogram that is constituted of a plurality of elemental holograms.

If an illumination light source and a hologram are integral with each other, no space for illumination is necessary and hence the apparatus can be miniaturized. Further, since the positional relationship between the hologram and the illumination light source is always the same, reproduction can always be performed under the optimum conditions. This is realized by an edge-lit hologram with which recording and reproduction are performed by using a recording medium that is stuck to a transparent light introduction block.

To produce, according to the edge-lit scheme, a transmission-type hologram for reproducing a three-dimensional image with light that passes through a recording medium, a hologram recording medium 611 is stuck to one surface 610a of a light introduction block 610 that is made of a transparent material, such as glass or plastic, having a proper thickness, as shown in FIG. 2. Usually, to prevent total reflection of light, the hologram recording medium 611 is stuck to the light introduction block 610 via an index matching liquid 612. While an object beam 614 coming from an object 613 is applied to the hologram recording medium 611 through the other surface 610b of the light introduction block 610, a reference beam 615 is applied to the hologram recording medium 611 through an end face 610c of the light introduction block 610. As a result, a transmission-type edge-lit hologram is produced.

For reproduction of a transmission-type edge-lit hologram that has been produced in the above manner, as shown in FIG. 3, in a state that a hologram 621 is stuck to one surface 620a of a light introduction block 620 for introduction of a reproduction illumination beam via an index matching liquid 622, a reproduction illumination beam 623 is applied to the hologram 621 through an end face 620b of the light introduction block 620. In passing through the hologram 621, the light is diffracted by the hologram 621. A resulting diffraction beam 624 causes a reproduction image 625, which is viewed by an observer 626.

On the other hand, to produce, according to the edge-lit scheme, a reflection-type hologram for reproducing a three-dimensional image with light that is reflected by a recording medium, a hologram recording medium 632 is stuck to one surface 630a of a light introduction block 630 via an index matching liquid 631 as shown in FIG. 4 in the same manner as in the case of producing a transmission-type edge-lit hologram. In the case of the reflection type, while an object beam 634 coming from an object 633 is applied to the hologram recording medium 632 from the side where the hologram recording medium 632 is stuck, a reference beam 635 is applied to the hologram recording medium 632 through an end face 630b of the light introduction block 630. As a result, a reflection-type edge-lit hologram is produced.

For reproduction of a reflection-type edge-lit hologram that has been produced in the above manner, as shown in FIG. 5, in a state that a hologram 641 is stuck to one surface 640a of a light introduction block 640 via an index matching liquid 642, a reproduction illumination beam 643 is applied to the hologram 641 through an end face 640b of the light introduction block 640. When reflected by the hologram 641, the light is diffracted by the hologram 641. A resulting diffraction beam 644 causes a reproduction image 645, which is viewed by an observer 646.

In edge-lit holograms as described above, by virtue of the structure in which the light source of a reproduction illumination beam and the light introduction block are integrated with each other, the reproduction optical system can be miniaturized and reproduction can always be performed under the optimum conditions. Further, edge-lit holograms have a feature that because of a large incident angle of a reproduction illumination beam, there does not occur an event that an image is reproduced by external light entering the light introduction block. Because of this feature, edge-lit holograms are increasingly used in different fields such a head-up display apparatus where reproduction of an image by light from the sun, for instance, is not preferable.

Various studies are now being made of colorization of holograms. Two methods are mainly known for this purpose, Lippmann holography and rainbow holography.

In Lippmann holography, a color hologram is produced by causing wavelength selectivity in such a manner that a reflection-type hologram is produced by applying an object beam and a reference beam through different surfaces of a hologram recording medium. However, to produce a color hologram according to Lippmann holography, it is necessary to use three laser beams or performing a swelling treatment on a recording medium. Therefore, the Lippmann holography is not appropriate for small, inexpensive image recording apparatuses.

On the other hand, the rainbow holography has an advantage that a color hologram is produced by a single laser beam and hence is suitable for small, inexpensive image recording apparatuses. The rainbow holography can be applied to a holographic stereogram by, for example, recording rainbow holograms on a hologram recording medium as elemental holograms. In the following description, a holographic stereogram produced in such a manner that each elemental hologram is a rainbow hologram is called a rainbow-type holographic stereogram.

However, various problems occur when attempts are made to produce a one-step holographic stereogram by utilizing the rainbow holography. The one-step holographic stereogram means a holographic stereogram that is a recording medium on which an interference fringe of an object beam and a reference beam is recorded directly. Another method of producing a holographic stereogram is to obtain it by transferring, to another recording medium, an interference fringe of an object beam and a reference beam that is recorded on a recording medium. A holographic stereogram produced in this manner is called a two-step holographic stereogram.

For example, an optical system shown in FIGS. 6A and 6B is used in producing a one-step holographic stereogram by utilizing the rainbow holography. FIG. 6A is a top view of an optical system of the entire image recording apparatus which produces a rainbow-type one-step holographic stereogram, and FIG. 6B is a side view of a portion handling an object beam of the optical system of the image recording apparatus.

As shown in FIGS. 6A and 6B, in this image recording apparatus, a reference beam La and an object beam Lb are applied to a recording medium 700 from the same side. A first lens 701 and a second lens 702 are provided in an object beam Lb side optical path. The first lens 701 focuses the object beam Lb in a direction in which an intended holographic stereogram should have a parallax indicated by arrow a. The second lens 702 focuses the object beam Lb in a direction in which the intended holographic stereogram should not have a parallax. In the following description, the direction in which an intended holographic stereogram should have a parallax is called a parallax direction, and the direction in which an intended holographic stereogram should not have a parallax is called a non-parallax direction indicated by arrow b.

In the image recording apparatus shown in FIGS. 6A and 6B, the reference beam La is applied at a predetermined angle from the same side as the object beam Lb. The object beam Lb is focused (i.e., given focusing action) in the non-parallax direction by the second lens 702 and then focused in the parallax direction by the first lens 701. The reference beam La and the object beam Lb interfere with each other on the hologram recording medium 700, whereby an elemental hologram is formed on the hologram recording medium 700.

In a holographic stereogram obtained by forming each elemental hologram in the above manner, each elemental hologram is a rainbow hologram. Therefore, such a holographic stereogram can be reproduced by white light as illustrated in FIG. 7.

Assume that, as shown in FIG. 7, a reproduction image is viewed in such a manner that while a white illumination beam 710 is applied to a holographic stereogram 711 at the same angle as a reference beam La was applied in forming each elemental hologram, the pupils 712 of an observer are located at the focal point of an object beam that was used in forming each elemental hologram. At this time, only that beam 713 of reproduction beams diffracted by each elemental hologram, which has the same wavelength component as in the recording, is incident on the pupils 712.

On the other hand, a beam 714 having a longer wavelength than the beam used in the recording is focused at a position different from the position of the pupils 712. Similarly, a beam 715 having a shorter wavelength than the beam used in the recording is focused at a position different from the position of the pupils 712. In this manner, only the reproduction beam having the particular color component is incident on the pupils 712 of the observer, who views an reproduction image with a low degree of blur due to color dispersion.

Incidentally, in the image recording apparatus of FIGS. 6A and 6B, the first lens 701 that is next to the recording medium 700 needs to be disposed at a position very distant from the recording medium 700 to prevent the reference beam La from entering the first lens 701. However, usually the first lens 701 should be a lens having a large converging angle. Therefore, to dispose the first lens 701 at a position distant from the recording medium 700, it is necessary to make the diameter of the first lens 701 very large, which is a problem.

Further, to produce a rainbow-type holographic stereogram, it is necessary to focus an object beam not only in the parallax direction (as in the case of producing an ordinary holographic stereogram) but also in the non-parallax direction. To this end, the image recording apparatus of FIGS. 6A and 6B has the second lens 702 for focusing the object beam Lb in the non-parallax direction on the side upstream of the first lens 701 for focusing the object beam Lb in the parallax direction, that is, on the side of a display device 703 for displaying an image to be recorded. However, if the second lens 702 is disposed upstream of the first lens 701, aberrations occur in the first lens 701, causing a problem that elemental holograms are not exposed sharply.

SUMMARY OF THE INVENTION

The present invention has been made in view of the above circumstances in the art, and an object of the invention is therefore to realize a rainbow-type holographic stereogram by utilizing the edge-lit scheme. That is, an object of the invention is to provide an image recording method and apparatus for recording an image on an edge-lit holographic stereogram.

The invention provides an image recording apparatus comprising an optical member for focusing or diverging an object beam in a non-parallax direction of a holographic stereogram to be formed; and a light introduction block in optical contact with a hologram recording medium, wherein a holographic stereogram is produced by forming a plurality of elemental holograms, each being formed by exposing the hologram recording medium in such a manner that the object beam that has been focused or diverged by the optical member is applied to one surface of the hologram recording medium while a reference beam is applied to the other surface of the hologram recording medium via the light introduction block.

In this image recording apparatus, the optical member focuses or diverges an object beam, and the focused or diverged object beam is applied to the hologram recording medium. Therefore, the image recording apparatus can produce a rainbow-type holographic stereogram. Further, a reference beam is applied to the hologram recording medium via the light introduction block. That is, a holographic stereogram produced by the image recording apparatus is an edge-lit holographic stereogram.

The invention also provides an image recording method for producing a holographic stereogram by forming a plurality of elemental holograms, each being formed by applying an object beam that has been focused or diverged in a non-parallax direction of a holographic stereogram to be formed to one surface of a hologram recording medium while applying a reference beam to the other surface of the hologram recording medium via a light introduction block that is in optical contact with the hologram recording medium.

In this image recording method, an object beam is applied to the hologram recording medium after being given focusing or diverging action. Therefore, the image recording method can produce a rainbow-type holographic stereogram. Further, a reference beam is applied to the hologram recording medium via the light introduction block. That is, the image recording method can produce an edge-lit holographic stereogram.

BRIEF DESCRIPTION OF THE DRAWINGS

FIG. 13 is a sectional view showing an example of the hologram recording medium;

FIGS. 14A–14C show a photosensing process of a photopolymerization-type photopolymer;

FIG. 27 shows an example of configuration in which a cylindrical Fresnel lens is used as an optical member for diverging an object beam in the non-parallax direction.

DETAILED DESCRIPTION OF THE PREFERRED EMBODIMENTS

An embodiment of the present invention in which the invention is applied to a holographic stereogram printer system for producing a one-step holographic stereogram will be hereinafter described with reference to the accompanying drawings.

1. Holographic Stereogram Printer System

First, a holographic stereogram printer system will be outlined below.

Figure 1:
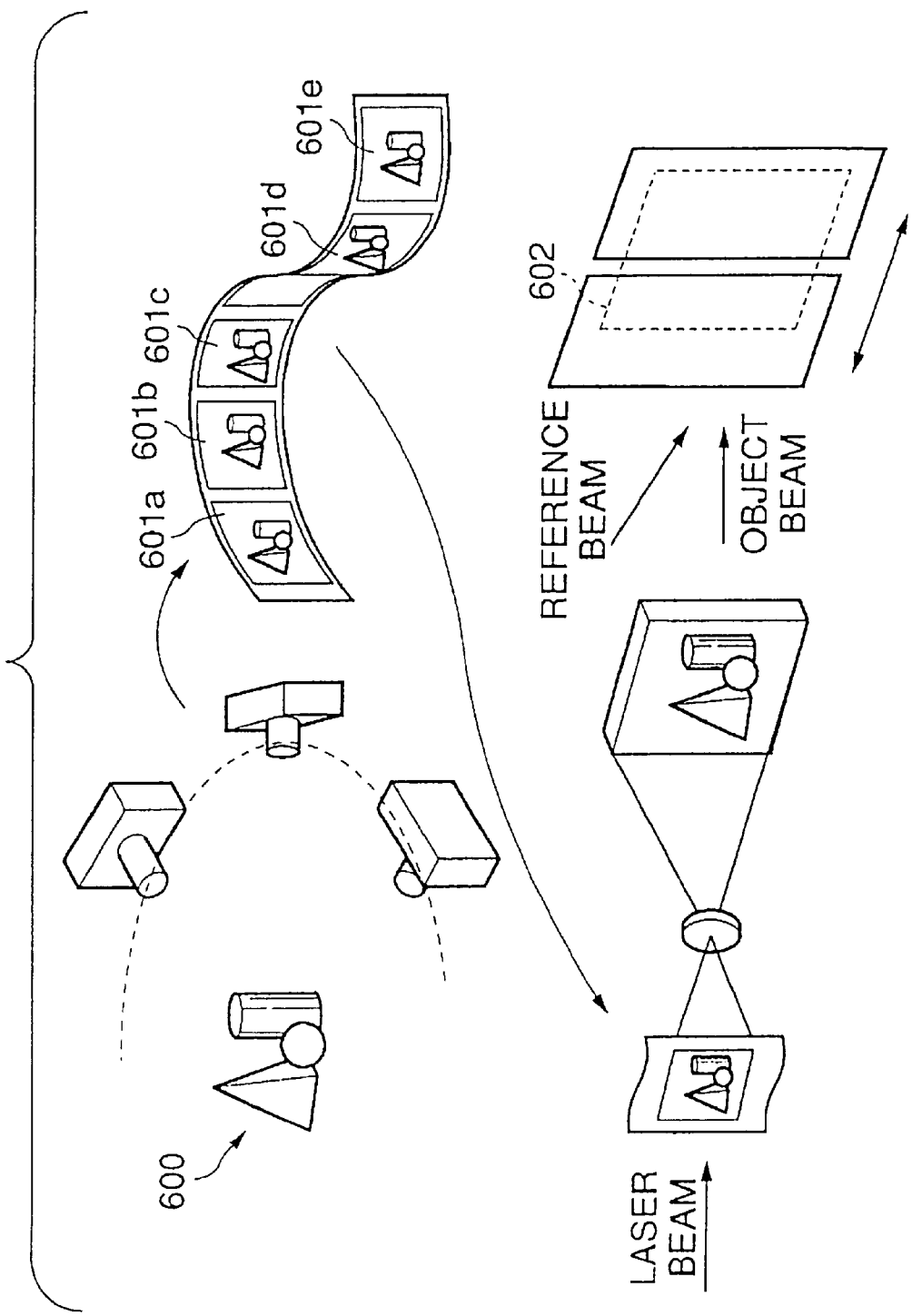
FIG. 1 schematically shows a manufacturing method of a holographic stereogram.
Figure 2:
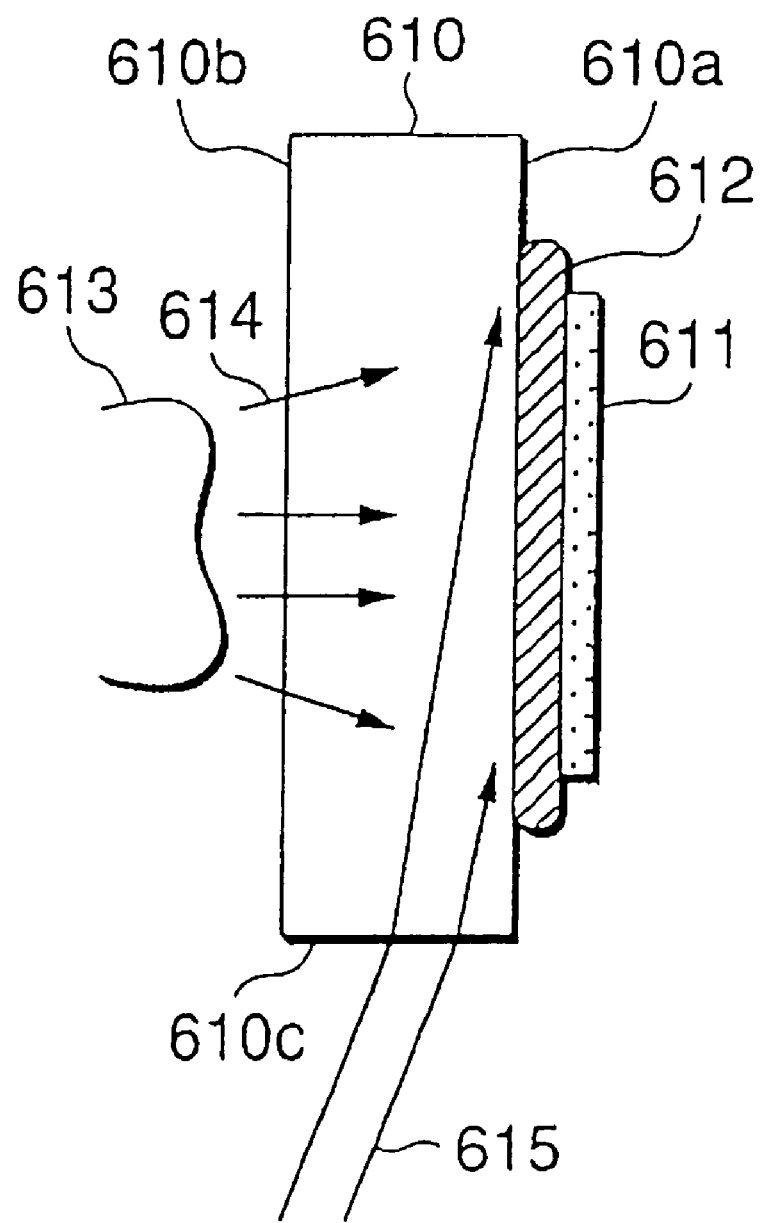
FIG. 2 schematically shows a manufacturing method of a transmission-type edge-lit hologram.
Figure 3:
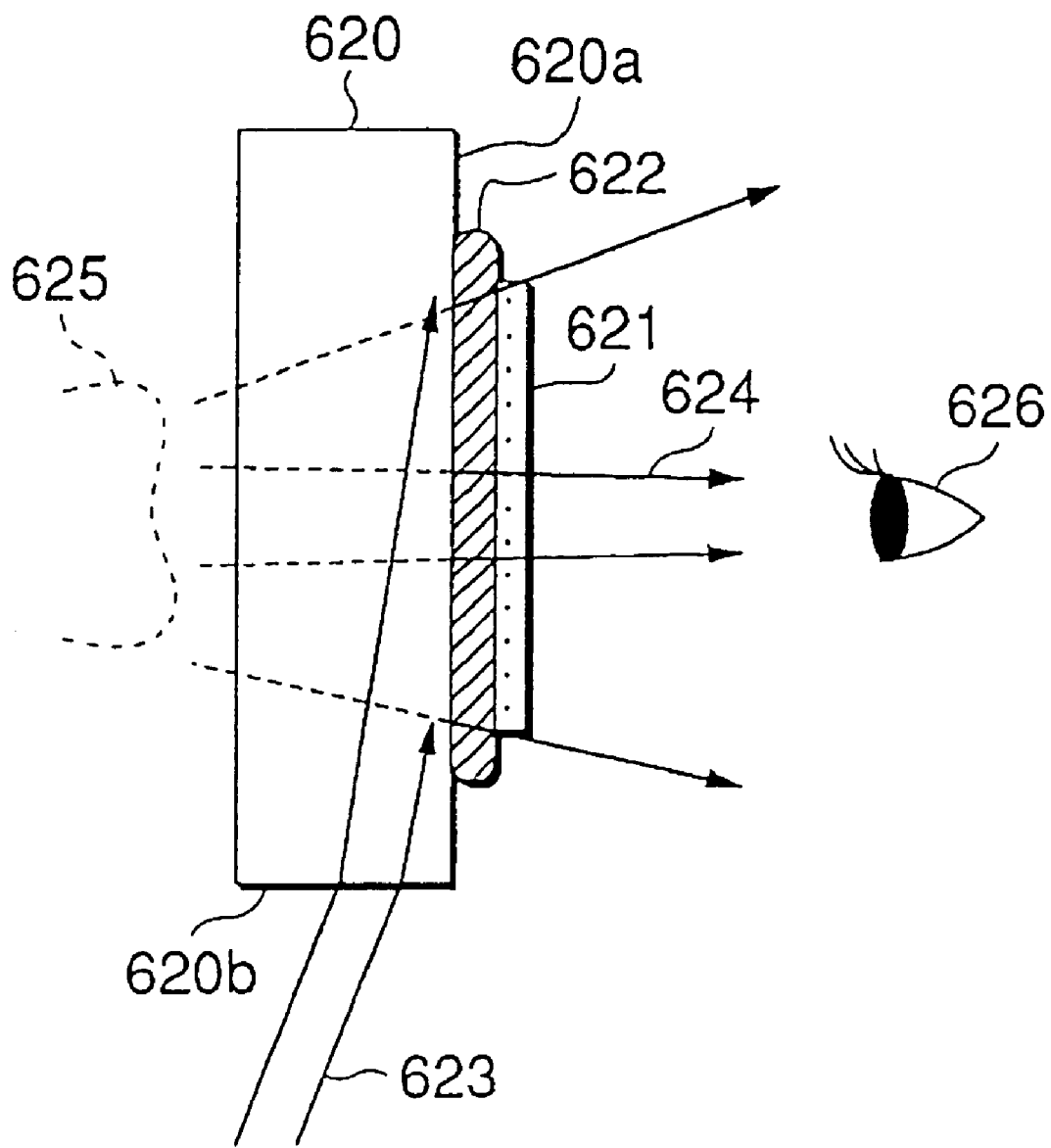
FIG. 3 schematically shows a reproduction method of a transmission-type edge-lit hologram.
Figure 4:
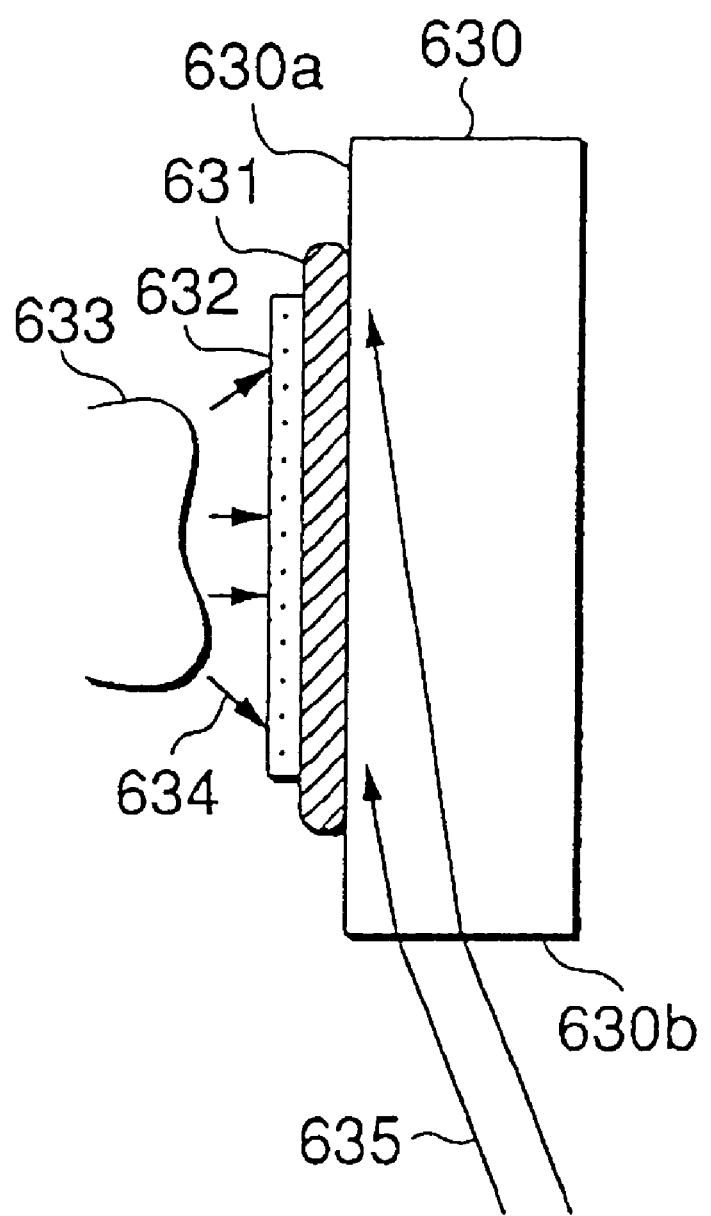
FIG. 4 shematically shows a manufacturing method of a reflection-type edge-lit hologram.
Figure 5:
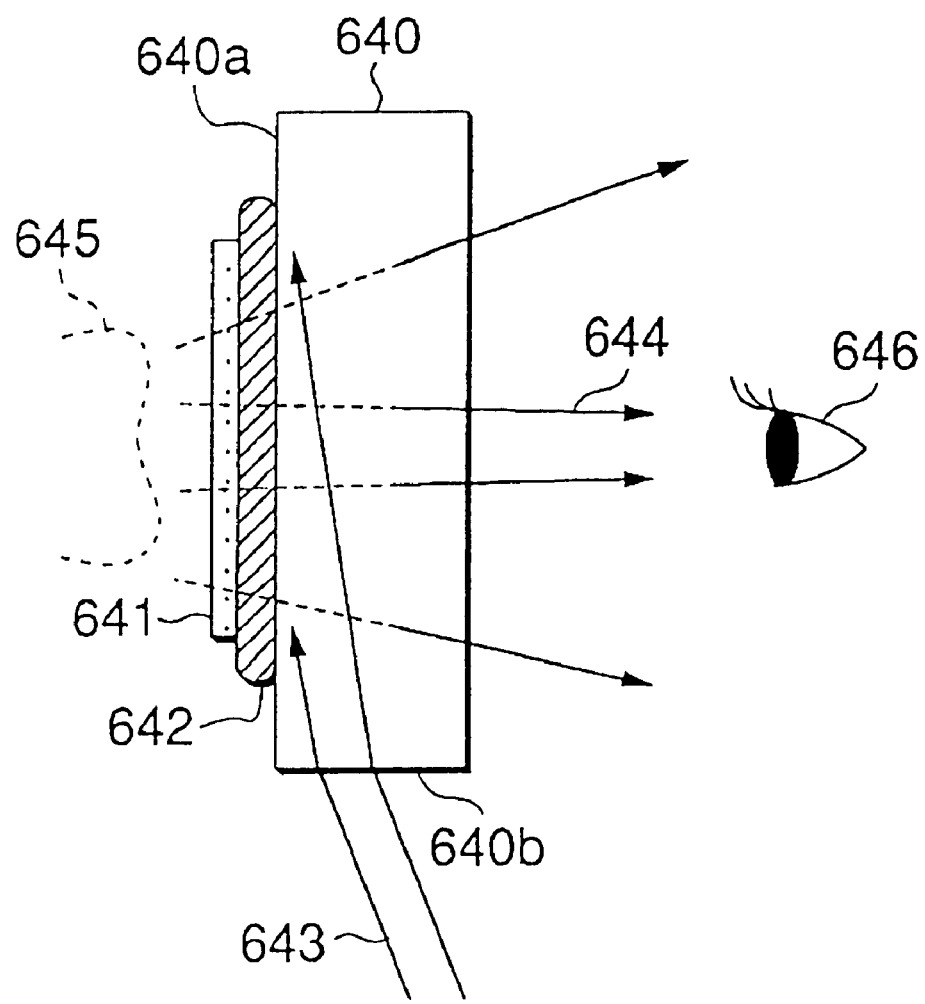
FIG. 5 schematically shows a reproduction method of a reflection-type edge-lit hologram.
Figure 6:
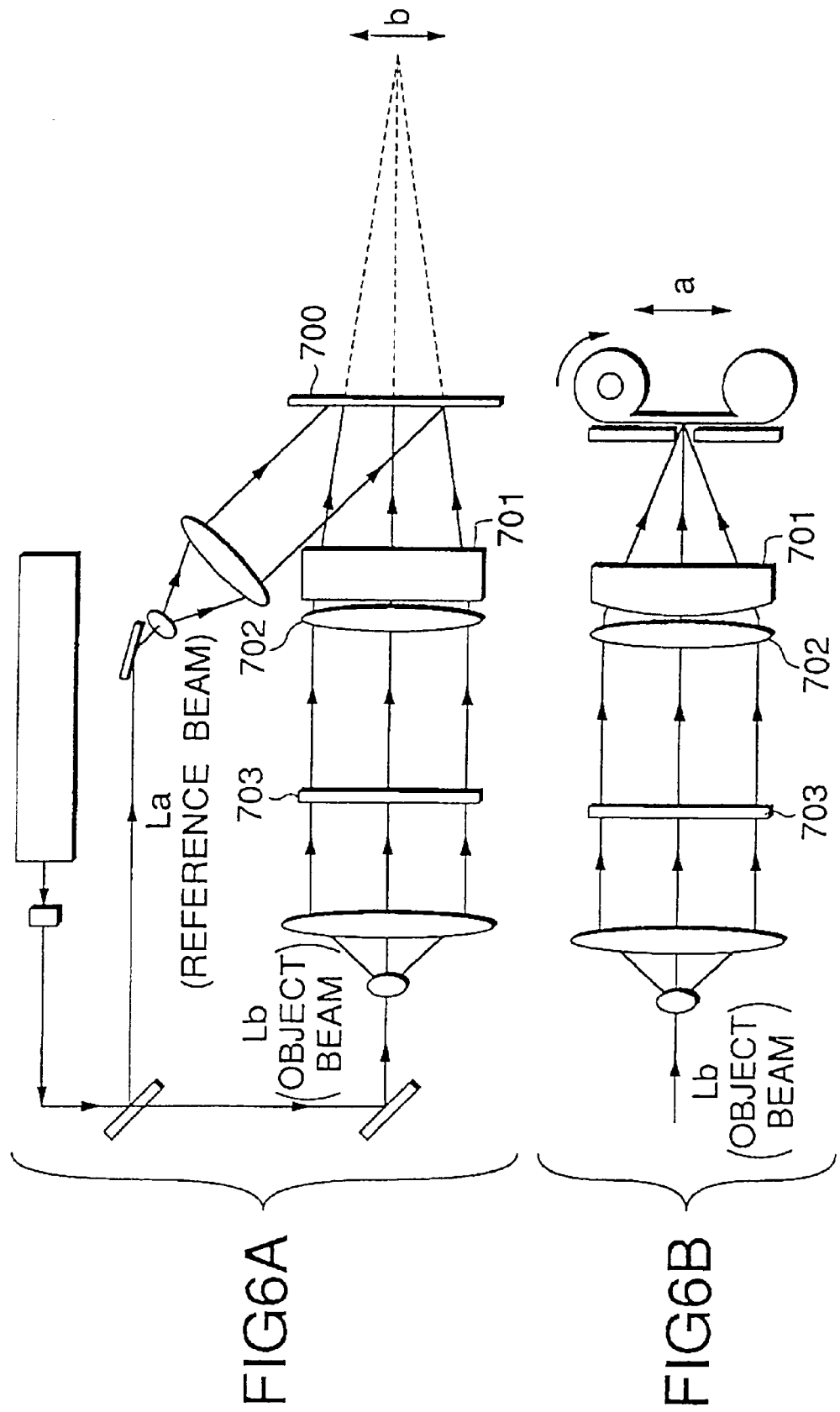
FIGS. 6A and 6B shows an optical system of a conventional image recording apparatus which produces a rainbow-type holographic stereogram.
Figure 7:
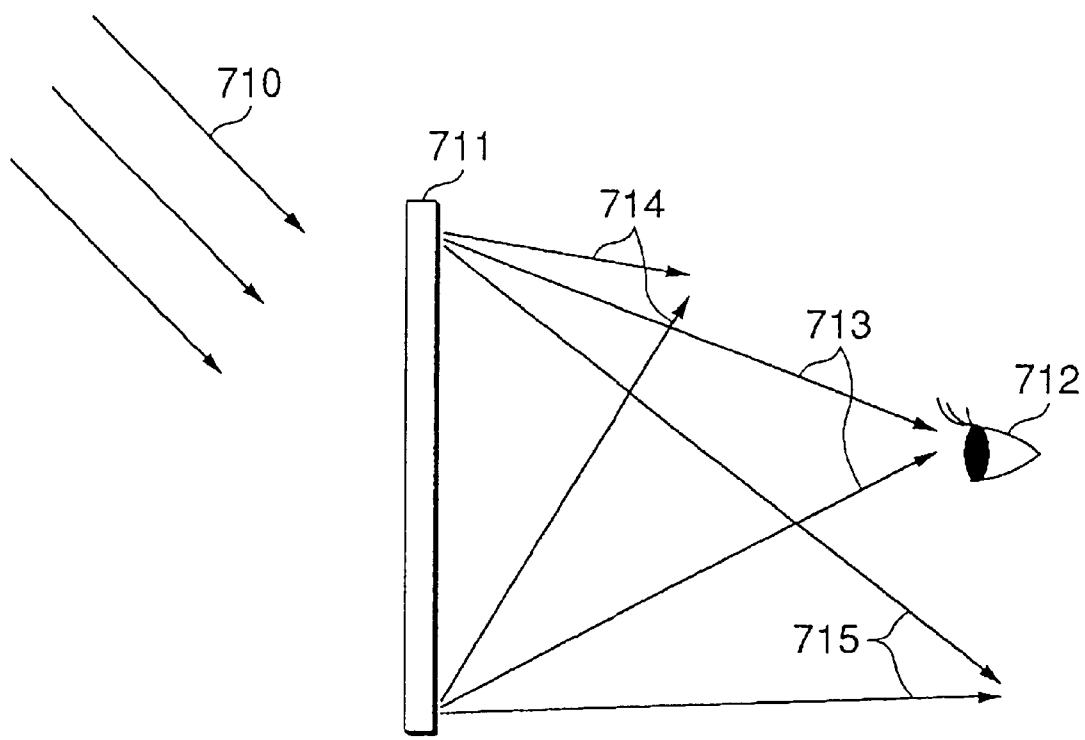
FIG. 7 schematically shows the principle of reproduction of a rainbow-type hologram.
Figure 8:
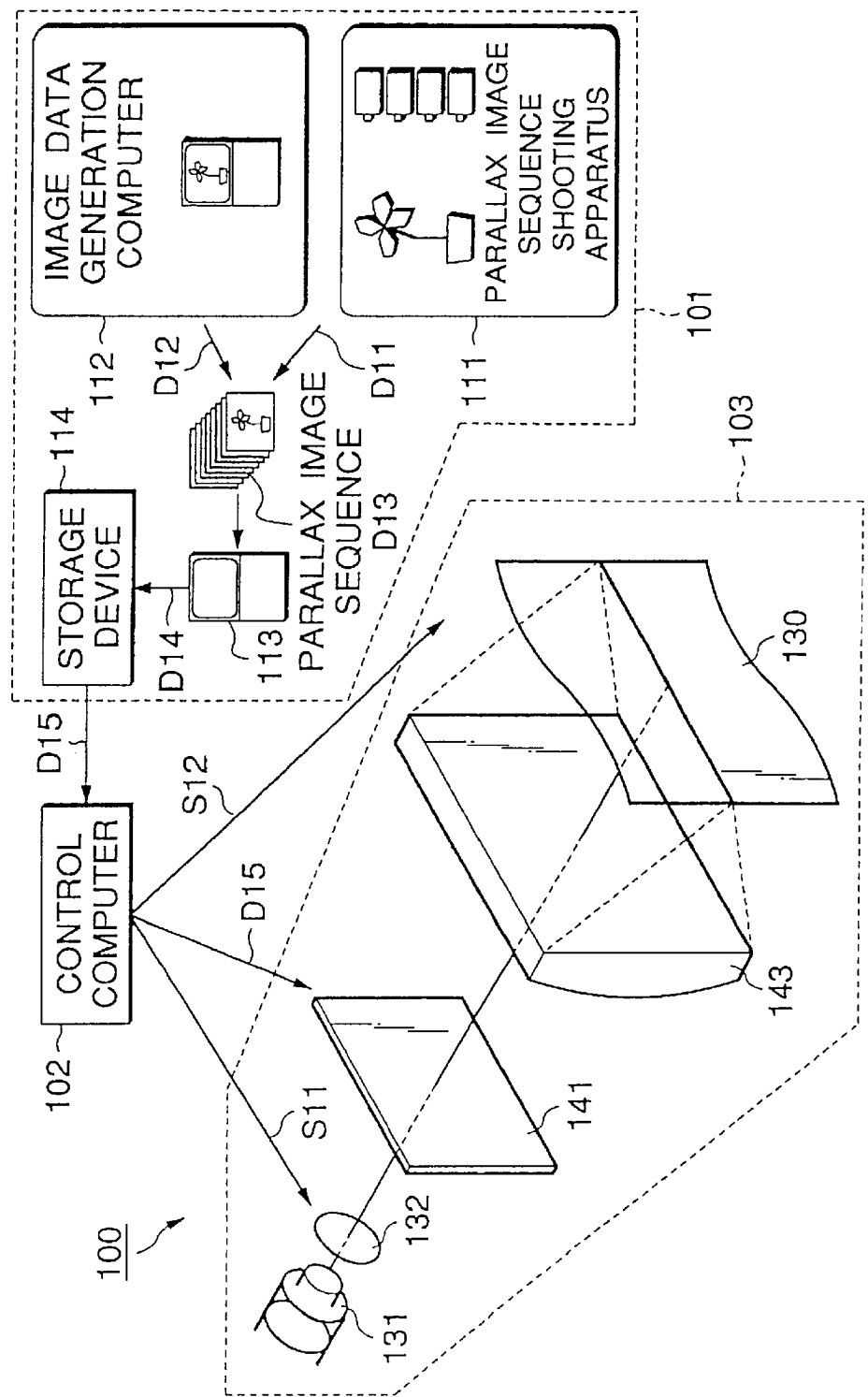
FIG. 8 shows an example of configuration of a holographic stereogram printer system.

FIG. 8 shows a general configuration of a holographic stereogram printer system 100. The holographic stereogram printer system 100, which produces a rainbow-type one-step holographic stereogram, is provided with a data processing section 101, a control computer 102, and a holographic stereogram printer 103.

In the data processing section 101, a parallax image sequence D13 is generated based on image data D11 (output from a parallax image sequence shooting apparatus 111) of a plurality of images that have been obtained by photographing an actual object from a plurality of observation points different in the horizontal direction (simultaneous photographing with a multiple-lens camera or consecutive photographing with a moving camera), or image data D12 (output from an image data generation computer 112) of a plurality of rendering images that have been generated by sequentially giving parallaxes in the horizontal direction. Each image data of the parallax image sequence D13 is subjected to given image processing in an image processing computer 113 and thereby converted into image data D14 for holographic stereogram generation. The image data D14 are stored in a storage device 114 such as a hard disk drive.

In a subsequent exposing operation, the data processing section 101 reads out, in order, the image data D14 of the parallax image sequence that are stored in the storage device 114 and sequentially sends the read-out image data D15 to the control computer 102.

In the exposing operation, the control computer 102 drive-controls a shutter 132, a liquid crystal display (hereinafter abbreviated as "LCD") 141, and a printer head unit (described later) of the holographic stereogram printer 103 based on the image data D15 of the parallax image sequence that is supplied from the data processing section 101.

Figure 9:
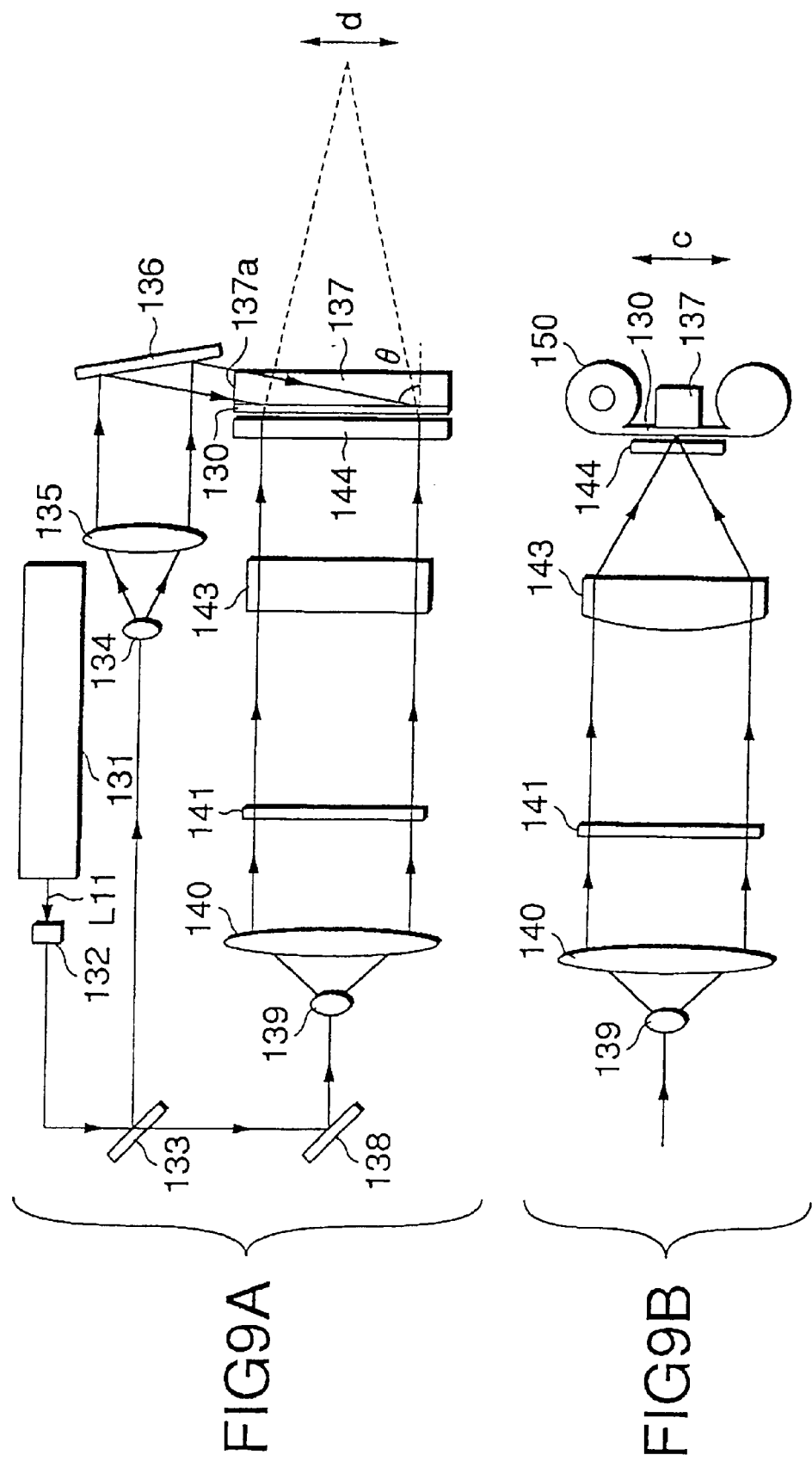
FIGS. 9A and 9B show an example of an optical system of a holographic stereogram printer.

The holographic stereogram printer 103 is configured as shown in FIG. 9. In FIG. 9, the components having the corresponding components in FIG. 8 are given the same reference numerals as in the latter. In the holographic stereogram printer 103, the LCD 141 is driven based on the image data D15 supplied from the control computer 102 and images corresponding to the respective image data D15 are sequentially recorded on a hologram recording medium 130 as rectangular elemental holograms. A holographic stereogram is produced in this manner.

In the holographic stereogram printer 103, the LCD 141 is driven based on one of the image data D15 supplied from the control computer 102, whereby an image corresponding to the one image data is displayed on the LCD 141. Further, a control signal S11 for driving the shutter 132 to open is sent from the control computer 102 to the shutter 132, whereby a laser beam L11 emitted from a laser light source 131 is input to a spatial filter 139 after being passed through or reflected by the shutter 132, a half mirror 133, and a mirror 138 in this order.

The laser beam L11 is expanded by the spatial filter 139 and then converted into a parallel beam by a collimator lens 140. Then, in passing through the LCD 141, the laser beam is converted into a projection beam that corresponds to an image displayed on the LCD 141. The projection beam is input to a cylindrical lens 143, focused in the parallax direction, indicated by arrow c, by the cylindrical lens 143, and then input to the hologram recording medium 130 that is held by a printer head unit 150.

A cylindrical Fresnel lens 144 for focusing the projection beam only in the non-parallax direction, indicated by arrow d, is disposed at such a position as not to touch the hologram recording medium 130, immediately before a position where the projection beam that has been given focusing action in the parallax direction by the cylindrical lens 143 impinges on the hologram recording medium 130. The cylindrical Fresnel lens 144 is necessary to make a produced holographic stereogram a rainbow-type one.

The focal length of the cylindrical lens 144 is set substantially equal to the distance between a holographic stereogram and a viewing point when an image is reproduced and viewed. That is, if the observation distance during reproduction is, for instance, 30 cm, the cylindrical Fresnel lens 144 should be one having a focal length 30 cm. For example, the cylindrical Fresnel lens 144 may be one made of polycarbonate and being 1 mm in thickness and 200 $\mu$m in pitch. It is preferable that the birefringence of the cylindrical Fresnel lens 144 be small, because such a cylindrical Fresnel lens increases the diffraction efficiency of a holographic stereogram.

On the other hand, part of the laser beam L11 reflected by the half mirror 133 is passed through or reflected by a cylindrical lens 134, a collimator lens 135, and a mirror 136 in this order and then input, as a reference beam, to the hologram recording medium 130 from its back side at a predetermined angle. The degree of reflection at the surface of the hologram recording medium 130 increases as the incident angle of the reference beam increases. In view of this, a light introduction block 137 is prepared and the reference beam is input through its end face. In this case, it is preferable that the optical path length of the reference beam set approximately equal to that of the part of the laser beam L11 (hereinafter called an object beam) that is passed through the half mirror 133, reflected by the mirror 138, and input to the hologram recording medium 130. This is because if the optical path difference of the reference beam and the object beam exceeds the coherence length of the laser beam L11, the coherence between the object beam and the reference beam is lowered.

In the above manner, in the holographic stereogram printer 103, the object beam (projection beam) and the reference beam can interfere with each other on the recording surface of the hologram recording medium 130, whereby an image displayed on the LCD 141 can be recorded, as an interference fringe, in rectangular form, on the hologram recording medium 130. The thus-recorded rectangular interference fringe becomes an elemental hologram constituting a holographic stereogram.

In the holographic stereogram printer 103, when recording of one image has finished, the control computer 102 drives the shutter 132 to interrupt the laser beam L11 that is emitted from the laser light source 131 and the driving of the LCD 141 is stopped. Further, under the control of the control computer 102, the printer head unit 150 is driven so that the hologram recording medium 130 is fed by one horizontal width of an elemental hologram.

Then, after the LCD 141 is driven under the control of the control computer 102 to display an image corresponding to the next one of the image data D15, the shutter 132 is opened, being controlled by the control computer 102, and the image displayed on the LCD 141 is recorded on the hologram recording medium 130. Thereafter, similar operations are repeated sequentially.

In the above-described manner, in the holographic stereogram printer 103, images corresponding to respective image data of a supplied parallax image sequence can sequentially be recorded, in rectangular form, on the hologram recording medium 130 and a desired holographic stereogram can thereby be obtained.

Incidentally, when an image is recorded on the hologram recording medium 130 in the above manner, two holograms, that is, a hologram that can be reproduced according to the reflection-type scheme and a hologram that can be reproduced according to the transmission-type scheme, are formed simultaneously. The principle of this phenomenon will be described with reference to FIG. 10. To simplify the description, it is assumed that the refractive index of the light introduction block 137 is equal to that of the hologram recording medium 130.

Figure 10:
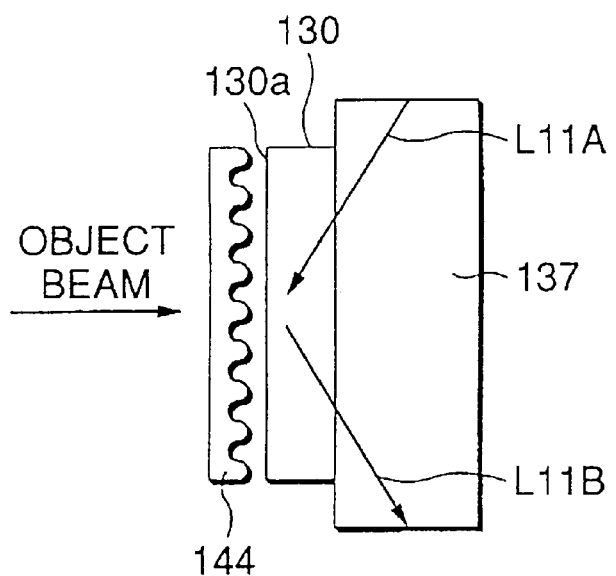
FIG. 10 shows how a reference beam is totally reflected at the surface of a hologram recording medium.

As shown in FIG. 10, a beam L11A that has entered the hologram recording medium 130 via the light introduction block 137 goes straight in the hologram recording medium 130 and is then totally reflected at an interface 130$a$ between the hologram recording medium 130 and the air. A beam L11B that is returned by the total reflection is also used as a reference beam. In other words, two kinds of reference beams traveling in opposite directions are applied to the hologram recording medium 130. Reproduction of a holographic stereogram produced in this manner can be performed according to the reflection-type scheme if an illumination light corresponding to the beam L11A before the total reflection is applied, and can be performed according to the transmission-type scheme if an illumination light corresponding to the beam L11B after the total reflection is applied.

Whether the reference beam is totally reflected at the interface 130$a$ between the hologram recording medium 130 and the air depends on the refractive index of the hologram recording medium 130 and the incident angle of the reference beam. Therefore, in practicing the invention, it is necessary to set the refractive index of the hologram recording medium 130 and the incident angle of a reference beam so as to satisfy such conditions that the reference beam is totally reflected.

Conversely, if a reference beam is not totally reflected at the interface 130a between the hologram recording medium 130 and the air, that is, if a reference beam passes through the hologram recording medium 130, part of the reference beam that has passed through the hologram recording medium 130 enters the optical members provided on the object beam side, for instance, the cylindrical Fresnel lens 144. In this case, there may occur an event that the reference beam is reflected by the cylindrical Fresnel lens 144 and re-enters the hologram recording medium 130. The beam that re-enters the hologram recording medium 130 after being reflected by the cylindrical Fresnel lens 144 acts as a noise component in recording an image.

Figure 11:
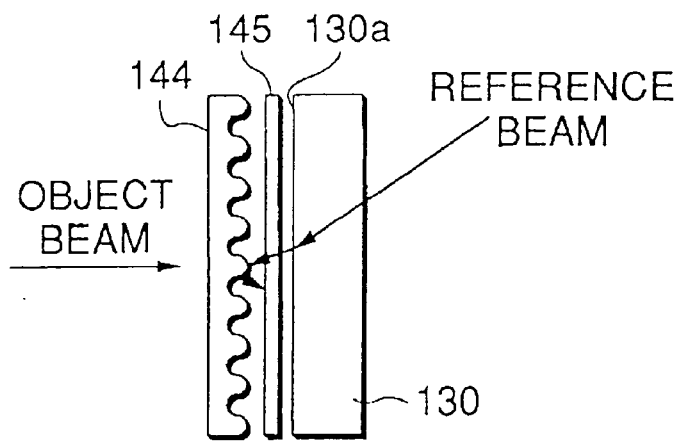
FIG. 11 shows a state that a louver film is inserted to prevent a reference beam from re-entering the hologram recording medium.

To prevent such re-entrance of a beam, it is necessary to insert, for instance, a louver film 145 between the cylindrical Fresnel lens 144 and the hologram recording medium 130 as shown in FIG. 11 in a case where a reference beam is not totally reflected at the interface 130a between the hologram medium 130 and the air. This measure prevents the reference beam from being reflected by the cylindrical Fresnel lens 144 and re-entering the hologram recording medium 130.

However, being provided in the optical path of an object beam, the louver film 145 becomes a factor of disturbing the object beam, thereby lowering the uniformity and the brightness of an image. In contrast, if setting is so made that a reference beam is totally reflected at the interface 130a between the hologram medium 130 and the air as shown in FIG. 10, the reference beam does not pass through the hologram recording medium 130 and hence the louver film 145 is not necessary. Accordingly, the uniformity and the brightness of an image are improved. Further, the optical system can be simplified as much as the elimination of the louver film 145. The fact that a reference beam is totally reflected and does not pass through at all is much preferable in forming a rainbow hologram.

To improve the sharpness of a recorded image, it is preferable that the cylindrical Fresnel lens 144 be provided at a position as close to the hologram recording medium 130 as possible. However, to allow a reference beam to be totally reflected at the surface of the hologram recording medium 130, it is necessary to provide a gap between the hologram recording medium 130 and the cylindrical Fresnel lens 144. That is, an air layer is interposed between the cylindrical Fresnel lens 144 and the hologram recording medium 130 so that a reference beam is totally reflected at the interface 130a between the hologram medium 130 and the air layer.

Alternatively, instead of the air, a substance having a refractive index that satisfies such a condition as to allow a reference beam to be totally reflected at the interface between the substance and the hologram recording medium 130 may be provided between the cylindrical Fresnel lens 144 and the hologram recording medium 130. That is, the hologram recording medium 130, a spacer having a refractive index that satisfies such a condition as to allow total reflection of a reference beam, and the cylindrical Fresnel lens 144 may be laid one on another.

If the cylindrical Fresnel lens 144 is too close to the hologram recording medium 130, there may occur an event that the surface structure of the cylindrical Fresnel lens 144 is sharply recorded on elemental holograms. In such a case, the image quality may be improved by somewhat moving the cylindrical Fresnel lens 144 away from the surface of the hologram recording medium 130.

Figure 12:
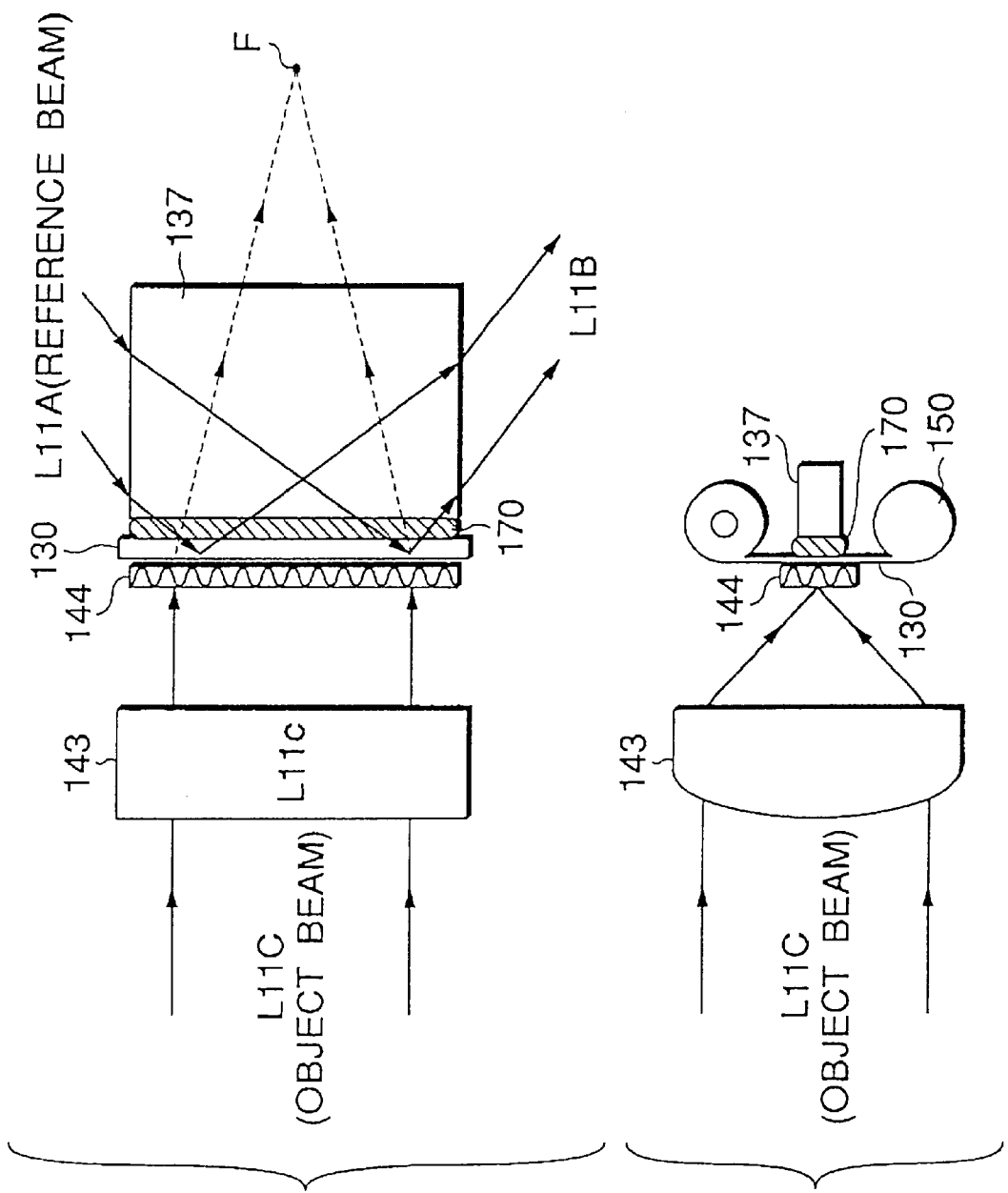
FIGS. 12A and 12B show an optical system in the vicinity of the hologram recording medium of the holographic stereogram printer.

FIGS. 12A and 12B are a top view and a side view, respectively, showing an optical system in the vicinity of the hologram recording medium 130.

As shown in FIG. 12A, a beam L11A that is input to the light introduction block 137 as a reference beam enters the hologram recording medium 130 that is provided via an index matching liquid 170 so as to be in optical contact with the light introduction block 137, and is then totally reflected at the interface between the hologram recording medium 130 and the air.

On the other hand, an object beam L11C is focused by the cylindrical lens 143 in the parallax direction approximately on the hologram recording medium 130 as shown in FIG. 12B, and is then focused by the cylindrical Fresnel lens 144 in the non-parallax direction as shown in FIG. 12A. Then, the object beam L11C enters the hologram recording medium 130, where it interferes with the above-mentioned beam L11A that enters the hologram recording medium 130 via the light introduction block 137 and a beam L11B that is produced by the total reflection of the beam L11A at the interface between the hologram recording medium 130 and the air, whereby an elemental hologram is formed in the hologram recording medium 130.

Since the object beam L11C entering the hologram recording medium 130 is given focusing action by the cylindrical Fresnel lens 144 in the non-parallax direction, it is focused at point F after passing through the light introduction block 137 as indicated by broken lines in FIG. 12A. The distance between point F and the hologram recording medium 130 should be set approximately equal to the distance in viewing a produced holographic stereogram. That is, as described above, the focal length of the cylindrical lens 144 should be set equal to the distance between a holographic stereogram and a viewing point when an image is reproduced and viewed.

As described above, a rainbow-type holographic stereogram can be produced by inputting the object beam L11C to the hologram recording medium 130 after focusing it also in the non-parallax direction.

2. Hologram Recording Medium

The hologram recording medium 130 used in the above holographic stereogram printer system will be described below.

As shown in FIG. 13, the hologram recording medium 130 is what is called a film coating type recording medium in which a photopolymer layer 130B containing of a photopolymerization-type photopolymer is formed on a tape-like film base 130A and is covered with a cover sheet 130C. For example, a layer made of type name OMNI-DEX (produced by DuPont; refractive index in an unexposed state: 1.487) and having a thickness of about 20 $\mu$m may be suitably used as the photopolymer layer 130B which serves as a photosensitive portion.

In the initial state, as shown in FIG. 14A, the photopolymerization-type photopolymer is such that monomers M are uniformly dispersed in a matrix polymer. When the photopolymerization-type photopolymer is illuminated with light L12 having power of about 10–400 mJ/cm$^2$, monomers M are polymerized at exposed portions as shown in FIG. 14B. As the polymerization proceeds, monomers M move to the exposed portions from around it and the density of monomers M varies from one place to another, causing refractive index modulation. Then, ultraviolet light or visible light L13 having a power of about 1,000 mJ/cm$^2$ is applied to the entire surface as shown in FIG. 14C, to complete the polymerization of the monomers M. Since the refractive index of the photopolymerization-type photopolymer is varied in accordance with the amount of light received, it can record, as a refractive index variation, an interference fringe that is caused by interference between a reference beam and an object beam.

The hologram recording medium 130 using the above photopolymerization-type photopolymer need not be subjected to any special treatment after the exposure. Therefore, by employing the hologram recording medium 130 using the photopolymerization-type photopolymer as the photosensitive portion, the holographic stereogram printer 103 can be simplified in configuration.

3. Printer Head Unit

Figure 15:
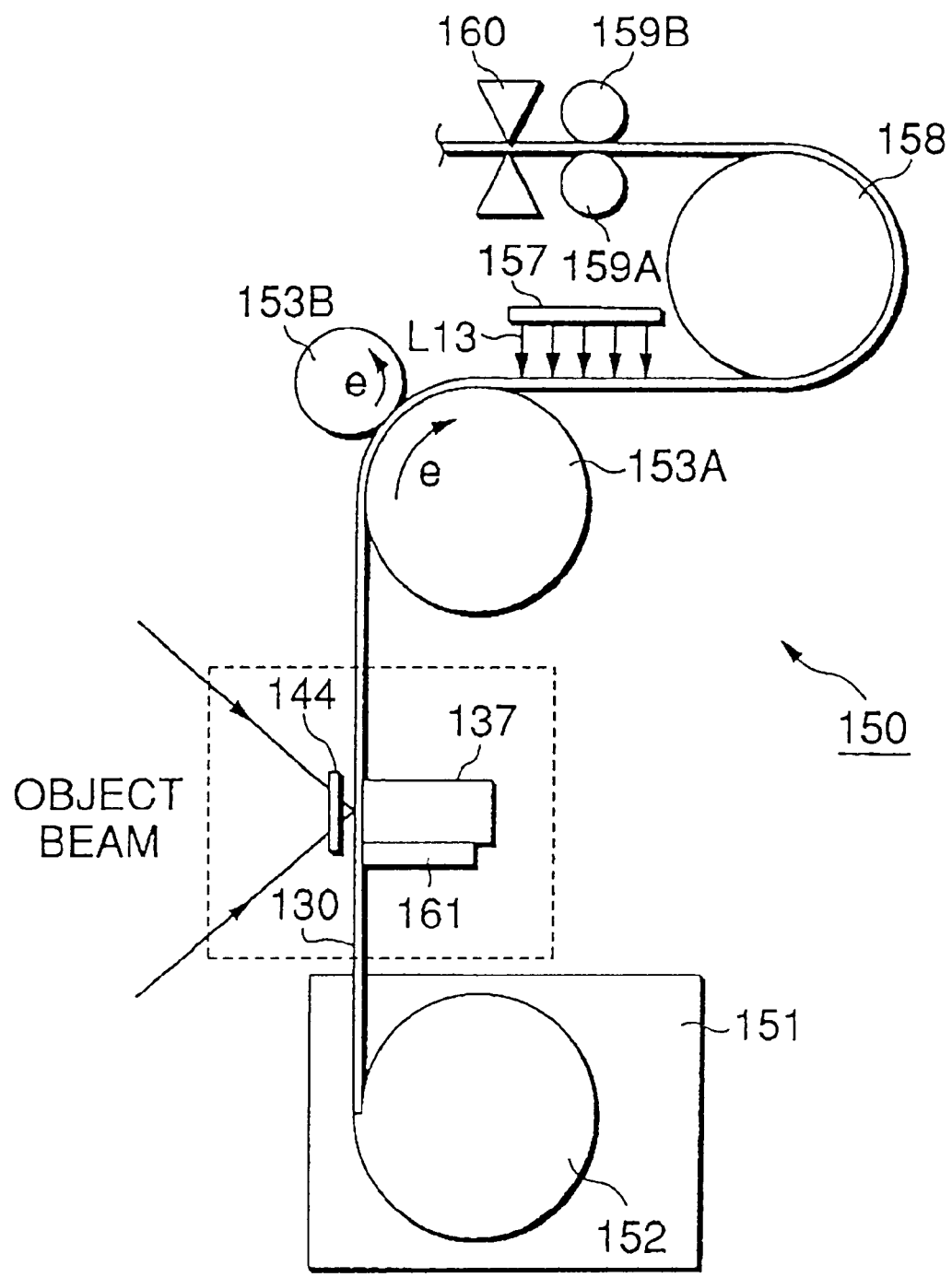
FIG. 15 shows a example of configuration of a printer head unit of the holographic stereogram printer and its vicinity.

In the holographic stereogram printer system 100, the point of the invention resides in the configuration of a portion of the holographic stereogram printer 103, in particular, the configuration in the printer head unit 150 and its vicinity. Therefore, the configuration of the printer head unit 150 and its vicinity will be described below in detail with reference to FIG. 15.

The printer head unit 150 has a mechanism of holding and transporting the hologram recording medium 130. That is, this mechanism axially supports, in a rotatable manner, at given torque, a roller 152 of a film cartridge 151 that is mounted at a predetermined position, and holds the hologram recording medium 130 that is pulled out from the film cartridge 151 in such a manner that it is interposed between a pair of intermittent feed rollers 153A and 153B. In this manner, the hologram recording medium 130 is set perpendicular to the optical axis of an object beam between the roller 152 and the intermittent feed rollers 153A and 153B.

The roller 152 and the intermittent feed rollers 153A and 153B are urged by a torsion coiled spring (not shown) in such directions as to go away from each other. In this manner, tension is given to the hologram recording medium 130 that is loaded so as to bridge the roller 152 and the intermittent feed rollers 153A and 153B.

In the printer head unit 150, the light introduction block 137 which is made of transparent glass or the like, is disposed at a position corresponding to the incident position of a reference beam so as to be in contact with the hologram recording medium 130. In recording that is performed according to the edge-lit scheme, the light introduction block 137 allows incidence of a reference beam at its end portion and causes the reference beam to be applied to the surface of the hologram recording medium 130 at an acute angle. Specifically, the light introduction block 137 is made of, for instance, glass named BK7 that has a refractive index 1.51.

In the printer head unit 150, an interference fringe is formed on the hologram recording medium 130 by an object beam that is incident on one surface of the hologram recording medium 130 and a reference beam that is incident on the other surface at an acute angle.

The reference beam reaches the hologram recording medium 130 that is in contact with the light introduction block 137 after entering the light introduction block 137 through its side face. At this time, as described above, a reflection-type elemental hologram is formed in such a manner that the reference beam interferes with the object beam in the hologram recording medium 130 before it reaches the interface between the hologram recording medium 130 and the air.

The reference beam returns after being totally reflected at the interface between the hologram recording medium 130 and the air also interferes with the object beam,to form a transmission-type elemental hologram. Therefore, reproduction, according to the transmission scheme, of a holographic stereogram produced in this manner is also possible. That is, although a holographic stereogram whose reproduction can be performed according to the transmission type is produced by employing the edge-lit scheme and by causing a reference beam to be totally reflected at the interface between the hologram recording medium 130 and the air, the reference beam can be input from the side opposite to the side from which an object beam is input.

An elemental hologram formed by a reference beam that returns after being totally reflected at the interface between the hologram recording medium 130 and the air is formed in such a manner that the reference beam interferes with an object beam that has been given focusing action by the cylindrical Fresnel lens 144. Therefore, this elemental hologram is a rainbow hologram. That is, with the above apparatus configuration, a rainbow-type holographic stereogram can easily be produced according to the edge-lit scheme.

Incidentally, in the printer head unit 150, the light introduction block 137 is provided so as to be in contact with the hologram recording medium 130. This structure can suppress minute vibration of the hologram recording medium 130 that would otherwise occur between the roller 152 and the intermittent feed rollers 153A and 153B, thereby enables formation of a bright (high in diffraction efficiency) holographic stereogram.

A sponge 161 containing a liquid 170 is provided so as to be in contact of both of the light introduction block 137 and the hologram recording medium 130. Since the liquid 170 contained in the sponge 161 is supplied to the film base 130A that supports the photopolymer layer 130B, it does not contact the photopolymer layer 130B directly.

The sponge 161 is made narrower than the hologram recording medium 130 so that the liquid 170 does not go around the hologram recording medium 130 to reach its back side. The liquid 170 to be contained in the sponge 161 should be a liquid having a refractive index that enables index matching between the hologram recording medium 130 and the light introduction block 137. Specifically, o-xylene is suitable for this purpose. The refractive index condition that enables index matching will be described later.

Because of the presence of the sponge 161, the liquid 170 can continuously be supplied to the boundary between the hologram recording medium 130 and the light introduction block 137, whereby the liquid 170 can always be interposed between the hologram recording medium 130 and the light introduction block 137. As a result, the light introduction block 137 and the hologram recording medium 130 can come in close contact with each other without formation of a gap in between. Therefore, the vibration of the hologram recording medium 130 can be suppressed sufficiently.

Another conceivable method to interpose the liquid 170 between the hologram recording medium 130 and the light introduction block 137 is to immerse the hologram recording medium 130, the light introduction block 137, etc. in a liquid. However, the use of the sponge 161 creates a simplified apparatus configuration and easy maintenance because the hologram recording medium 130 and the light introduction block 137 are provided in the air and the liquid 170 is held by surface tension.

On the other hand, the intermittent feed rollers 153A and 153B can be rotated freely in the directions indicated by arrows e by rotational force produced by a stepping motor (not shown). Based on a control signal S12 that is supplied from the control computer 102, the stepping motor sequentially rotates the intermittent feed rollers 153A and 153B by a predetermined angle every time the exposure of one image is finished. In this manner, the hologram recording medium 130 is fed each time by a distance corresponding to one elemental hologram.

An ultraviolet lamp 157 is provided downstream of the intermittent feed rollers 153A and 153B along the path of the hologram recording medium 130. The ultraviolet lamp 157 applies, at predetermined power, ultraviolet light L13 for completing the diffusion of monomers M in exposed portions of the hologram recording medium 130.

A heat roller 158 that is axially supported in a rotatable manner, a pair of discharge feed rollers 159A and 159B, and a cutter 160 are provided in this order downstream of the ultraviolet lamp 157 along the path of the hologram recording medium 130. The discharge feed rollers 159A and 159B hold the hologram recording medium 130 so that the hologram recording medium 130 is wound on a half of the circumferential surface of the heat roller 158.

Equipped with a heating means (not shown) such as a heater inside, the circumferential surface of the heat roller 158 can be kept at about 120° C. The employment of this setting is based on an experiment in which it was confirmed that refraction index modulation in approximately the same degree as obtained when an exposed photopolymerization-type photopolymer (OMNI-DEX) is heated at 120° C. for 2 hours in an air atmosphere can be obtained by heating it for 5 minutes while interposing it between a heating plate that is temperature-controlled so that its temperature is constantly kept at 120° C. and a glass plate that is pressed by resilient force from above.

The outside diameter of the heat roller 158 is determined so that the time taken from the start of attachment of the hologram recording medium 130 to the circumferential surface of the heat roller 158 to its removal is approximately equal to the fixing time of a recorded image. Therefore, an image recorded on the hologram recording medium 130 is fixed reliably at a time point when it has passed the heat roller 158.

A driving mechanism (not shown) of the discharge feed rollers 159A and 159B (hereinafter referred to as a discharge feed roller driving mechanism) rotates the discharge feed rollers 159A and 159B in synchronism with the intermittent feed rollers 153A and 153B at each intermittent feed of the hologram recording medium 130 based on a control signal S12 that is output from the control computer 102. As a result, the hologram recording medium 130 can be kept in close contact with the circumferential surface of the heat roller 158 in a reliable manner without being loosened between the intermittent feed rollers 153A and 153B and the discharge feed rollers 159A and 159B.

A driving mechanism (not shown) of the cutter 160 (hereinafter referred to as a cutter driving mechanism) drives, based on the control signal S12 that is supplied from the control computer 102, the cutter 160 at a time point when all regions of a desired image recorded on the hologram recording medium 130 have been discharged outside the cutter 160, to separate a portion of the hologram recording medium 130 bearing all regions of the image from other portion. In this manner, the portion of the hologram recording medium 130 on which the image is recorded can be discharged outside as a single holographic stereogram.

4. Operation of Holographic Stereogram Printer

The operation of the holographic stereogram printer 103 in producing a holographic stereogram by using the holographic stereogram printer having the above-described printer head unit 150 will be described below.

In producing a holographic stereogram, first the hologram recording medium 130 having the structure as shown in FIG. 13 is accommodated in the film cartridge 151 in a state that the hologram recording medium 130 is wound on the roller 152.

Then, the hologram recording medium 130 is loaded between the roller 152 and the intermittent feed rollers 153A and 153B and the light introduction block 137 is set so as to contact the hologram recording medium 130. The sponge 161 is caused to contain a sufficient amount of the liquid the liquid 170.

Before actual recording onto the hologram recording medium 130, a control signal S12 is sent from the control computer 102 to the stepping motor and the discharge feed rollers driving mechanism of the printer head unit 150 to drive those. As a result, the hologram recording medium 130 is fed by a distance longer than the contact length of the hologram recording medium 130 and the light introduction block 137. At this time, the liquid 170 is supplied from the sponge 161 to the hologram recording medium 130 at a position where the hologram recording medium 130 starts to contact the light introduction block 137. Therefore, the hologram recording medium 130 and the light introduction block 137 contact each other in a state where the liquid 170 is interposed in between. That is, the hologram recording medium 130 and the light introduction block 137 optically contact each other via the liquid 170.

Then, the LCD 141 is driven by causing the control computer 102 to supply it with image data D15 corresponding to an image of a parallax image sequence, whereby an image corresponding to the image data D15 is displayed on the LCD 141.

Further, a control signal S11 is sent from the control computer 102 to the shutter 132 and the shutter 132 is thereby opened, and a laser beam L11 emitted from the laser light source 131 is applied to the hologram recording medium via the LCD 141. At this time, as described above, after being emitted from the laser light source 131, the laser beam L11 is passed through or reflected by the shutter 132, the half mirror 133, the mirror 138, the spatial filter 139, and the collimator lens 140 in this order. The laser beam L11 is thus input to the hologram recording medium 130 as an object beam (projection beam). After being emitted from the laser light source 131 and passed through the shutter 132, a half of the laser beam L11 is reflected by the half mirror 133, passed through or reflected by the cylindrical lens 134, the collimator lens 135, and the mirror 136 in this order, and then input to the back surface of the hologram recording medium 130 as a reference beam.

In the above manner, the object beam and the reference beam interfere with each other in the hologram recording medium 130 (i.e., the hologram recording medium 130 is exposed), whereby the image displayed on the LCD 141 is recorded on the hologram recording medium 130 in rectangular form as an interference fringe.

After the completion of the image recording, under the control of the control computer 102, the shutter 132 is closed to interrupt the laser beam L11 emitted from the laser light source 131 and the driving of the LCD 141 is stopped. Further, a control signal S12 is sent from the control computer 102 to the stepping motor and the discharge feed roller driving mechanism of the printer head unit 150 to drive those, whereby the hologram recording medium 130 is fed by a distance corresponding to one elemental hologram. It is not necessary to separate the light introduction block 137 from the hologram recording medium 130 when the hologram recording medium 130 is fed.

Thereafter, the operation of displaying an image corresponding to image data D15 on the LCD 141, the operation of exposing the hologram recording medium 130 by causing an object beam and a reference beam to interfere with each other in the hologram recording medium 130 by opening the shutter 132, the operation of feeding the hologram recording medium 130 by a distance corresponding to one elemental hologram with the stepping motor and the discharge feed rollers driving mechanism, and other operations are repeated, whereby image data D15 corresponding to respective images of the parallax image sequence supplied from the data processing section 101 are sequentially recorded on the hologram recording medium 130 in rectangular form.

In the printer head unit 150, ultraviolet light L13 is applied to the entire surface of a newly fed portion of the hologram recording medium 130 with the ultraviolet lamp 157 at the position downstream of the position where the hologram recording medium 130 is exposed by an object beam and a reference beam. As a result, as shown in FIG. 14C, the polymerization of monomers M at exposed portions of the photopolymer layer 130B is completed in the hologram recording medium 130.

At the position downstream of the ultraviolet lamp 157, the hologram recording medium 130 is heated by the heat roller 158. As a result, the degree of refractive index modulation of the photopolymer layer 130B is increased and the recorded image is fixed.

Further, at the position downstream of the heat roller 158, the cutter driving mechanism is driven based on the control signal S12 that is supplied from the control computer 102, whereby a completed holographic stereogram is cut into a predetermined size by the cutter 160 and discharged outside.

As described above, in recording a desired image on the hologram recording medium 130, the liquid 170 is continuously supplied to the boundary between the hologram recording medium 130 and the light introduction block 137 so that the liquid 170 is always interposed in between. As a result, the hologram recording medium 130 and the light introduction block 137 come in close contact with each other without formation of a gap in between. Therefore, the vibration of the hologram recording medium 130 can be suppressed sufficiently. Further, in this embodiment, since the hologram recording medium 130 and the light introduction block 137 are disposed in the air and the liquid 170 is held by surface tension, the maintenance can be done easily.

5. Reproduction of Image from Holographic Stereogram

A method of reproducing an image from a holographic stereogram produced in the above manner will be described below.

As described above, a holographic stereogram produced in the above manner includes not only a reflection-type hologram that has been formed by a reference beam before reaching the interface between the hologram recording medium 130 and the air but also a transmission-type hologram that has been formed by a reference beam after being totally reflected at the interface between the hologram recording medium 130 and the air. The transmission-type hologram thus formed is a rainbow hologram because it has been formed through interference between an object beam focused by the cylindrical Fresnel lens 144 and a reference beam entering the hologram recording medium 130 from the same side as the object beam.

Figure 16:
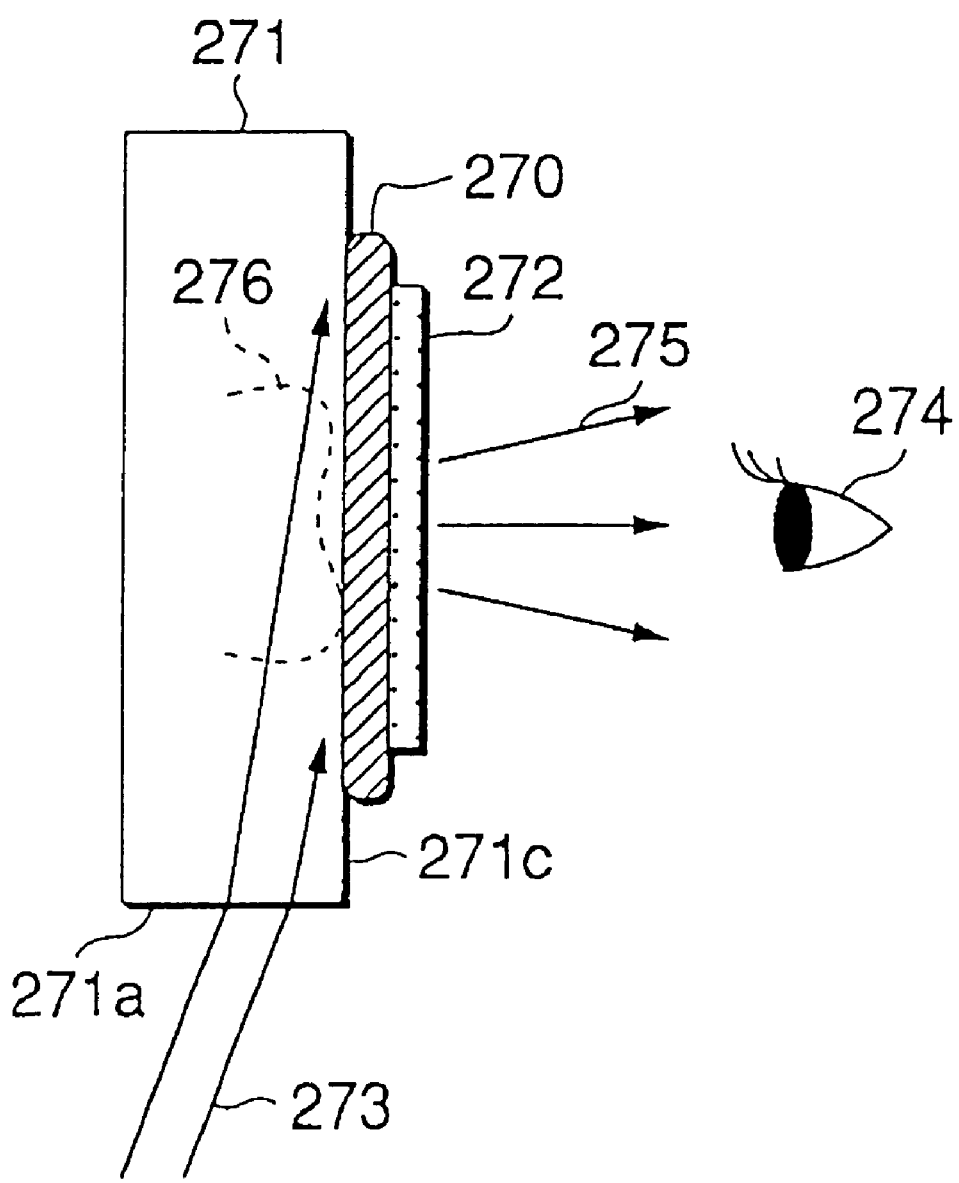
FIG. 16 schematically shows a method of reproducing an image from a holographic stereogram according to the transmission scheme.

Therefore, an image from a holographic stereogram that has been recorded according to the above-described manner may be reproduced according to the transmission scheme in the following manner. That is, as shown in FIG. 16, in a state that a holographic stereogram 272 is stuck to an illumination beam introduction block 271 via a liquid 270, a reproduction illumination beam 273 is applied to the holographic stereogram 272 through an end portion 271a of the illumination beam introduction block 271. The holographic stereogram 272 is stuck to a surface 271c of the illumination beam introduction block 271 that is closer to an observer 274. The observer 274 views a reproduction image 276 through a diffraction beam 275 that has been diffracted and transmitted by the holographic stereogram 272.

Figure 17:
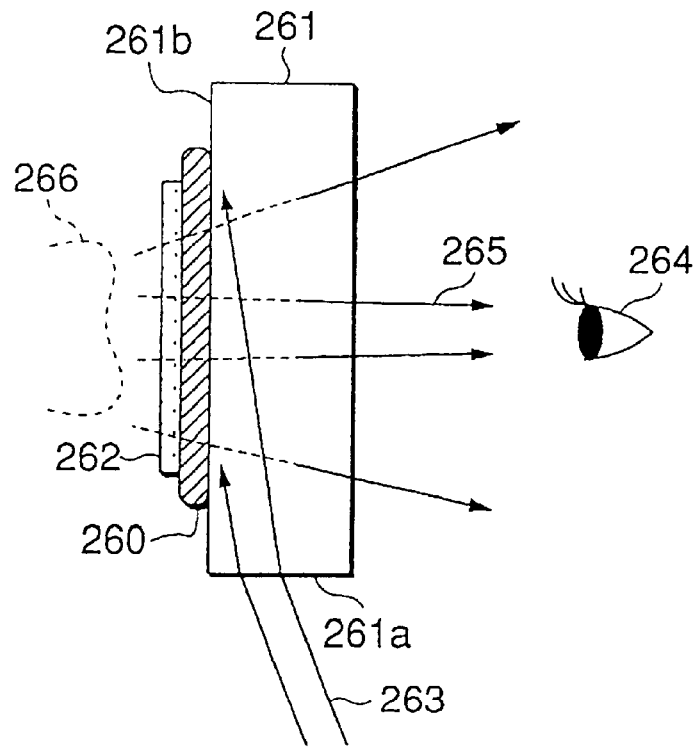
FIG. 17 schematically shows a method of reproducing an image from a holographic stereogram according to the reflection scheme.

It is also possible to reproduce, according to the reflection scheme, an image from a holographic stereogram that has been recorded according to the above-described manner. That is, as shown in FIG. 17, in a state that a holographic stereogram 262 is stuck to an illumination beam introduction block 261 via a liquid 260, a reproduction illumination beam 263 is applied to the holographic stereogram 262 through an end portion 261a of the illumination beam introduction block 261. The holographic stereogram 262 is stuck to a surface 261b of the illumination beam introduction block 261 that is farther from an observer 264. The observer 264 views a reproduction image 266 through a diffraction beam 265 that has been reflected by the holographic stereogram 262.

Where a three-dimensional image is reproduced according to the transmission scheme as in the case of FIG. 16, a reproduction image (276) is perceived as if it existed at a position closer than the reproduced image according to the reflection scheme as in the case of FIG. 17. Therefore, by reproducing a three-dimensional image in the manner as shown in FIG. 16, the three-dimensional effect and the display effect can be enhanced.

The illumination beam introduction blocks 261 and 271 need not always be a rectangular parallelepiped, and may have any shape as long as the incident angle of the reproduction illumination beam 263 or 273 is set equal to that of a reference beam that was applied to the hologram recording medium 130 at the time of recording.

6. Conditions on Liquid Interposed between Hologram Recording Medium and Light Introduction Block In the above holographic stereogram printer 103, the liquid 170 is interposed between the hologram recording medium 130 and the light introduction block 137. The conditions imposed on the liquid 170 will be described below.

As in the case of the holographic stereogram printer 103, in the edge-lit-type recording, a reference beam is applied to the hologram recording medium 130 at an acute angle. Therefore, there is a possibility that the reference beam is totally reflected at the interface between the light introduction block 137 and the hologram recording medium 130, or asperity of the surface of the photopolymer layer 130B where an image is actually recorded in the hologram recording medium 130 causes a reproduction image to have gain-like unevenness. To prevent such phenomena, the liquid 170 that is interposed between the light introduction block 137 and the hologram recording medium 130 must enable index matching between those members. That is, the liquid 170 should satisfy ensure that total reflection does not occur between the interface at the light introduction block 137 and the liquid 170 or between the interface at the liquid 170 and the hologram recording medium 130, and ensure that the intensity reflectance (s component) is made small at each of the above interfaces.

Figure 18:
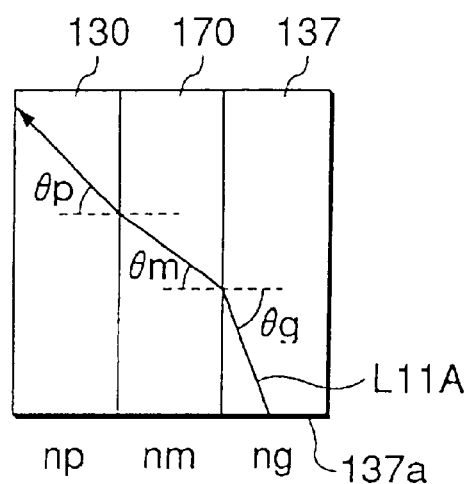
FIG. 18 shows an incident path of a reference beam that is used for determining conditions to be satisfied by the refraction index of a liquid.

As shown in FIG. 18, ray angles $\theta_g$, $\theta_m$, $\theta_p$ formed at the respective interfaces when a reference beam L11A enters the light introduction block 137 having a refractive index $n_g$ through its end portion 137a, passes through the liquid 170 having a refractive index $n_m$, and reaches the hologram recording medium 130 having a refractive index $n_p$ satisfy Equation (1).

$$n_g \sin \theta_g = n_m \sin \theta_m = n_p \sin \theta_p \quad (1)$$

Conditions for preventing total reflection at each interface are expressed by Inequalities (2) and (3).

$$n_m > n_g \sin \theta_g \quad (2)$$

$$n_p > n_m \sin \theta_m (= n_g \sin \theta_g) \quad (3)$$

Where the photopolymer layer 130B of the hologram recording medium 130 is made of a material having a refractive index 1.487 as described above, Inequality (4) to be satisfied by $n_g$ is obtained by substituting $n_p = 1.487$ into Inequality (3).

$$n_g < 1.487/\sin \theta_g \quad (4)$$

If it is assumed that $\theta_g = 75°$ or $\theta_g = 78°$, Inequalities (5) and (6) for n m are obtained.

$$\text{When } \theta_g = 75°, \, n_g < 1.539 \quad (5)$$

$$\text{When } \theta_g = 78°, \, n_g < 1.520 \quad (6)$$

An example of a material that satisfies Inequalities (5) and (6) is glass named BK7 that has a refractive index 1.51. Where the light introduction block 137 is made of BK7, a condition to be satisfied by $n_m$ can be calculated by substituting $n_g = 1.51$ into Inequality (2).

If it is assumed that $\theta_g = 75°$ or $\theta_g = 78°$, Inequalities (7) and (8) for $n_m$ are obtained.

$$\text{When } \theta_g = 75°, \, n_m > 1.458 \quad (7)$$

$$\text{When } \theta_g = 78°, \, n_m > 1.477 \quad (8)$$

That is, to prevent the reference beam L11A from being totally reflected at the interface between the light introduction block 137 and the hologram recording medium 130, the liquid 170 that is interposed between the light introduction block 137 and the hologram recording medium 130 should be made of a material whose refractive index $n_m$ satisfy Inequality (7) or (8).

However, in producing a holographic stereogram, satisfying only the above condition is still insufficient; it is necessary that the intensity reflectance (s component) at each interface be made small. This is because if the reflection at each interface is strong, not only the optical loss increases but also a reflected beam forms an additional, desirable hologram, to reduce the diffraction efficiency. In contrast to the fact that the above condition for preventing total reflection is applied to the case where each interface is a flat surface, in an actual hologram recording medium 130 the surface of the photopolymer layer 130B has some undulation. Therefore, even if the above condition is satisfied, there may exist portions where total reflection occurs, to possibly cause a grain-like image.

The intensity reflectance (s component) $Rs_{(g-m)}$ at the interface between the light introduction block 137 and the liquid 170 and the intensity reflectance (s component) $Rs_{(m-p)}$ at the interface between the liquid 170 and the hologram recording medium 130 are given by Equations (9) and (10).

$$Rs_{(g-m)} = \sin^2(\theta_g - \theta_m)/\sin^2(\theta_g + \theta_m) \quad (9)$$

$$Rs_{(m-p)} = \sin^2(\theta_m - \theta_p)/\sin^2(\theta_m + \theta_p) \quad (10)$$

Since it is preferable that each of $Rs_{(g-m)}$ and $Rs_{(m-p)}$ be as close to zero as possible, a calculated value of Formula (11) below should be as close to 1 as possible.

$$(1-Rs_{(g-m)}) \times (1-Rs_{(m-p)}) \quad (11)$$

Figure 19:
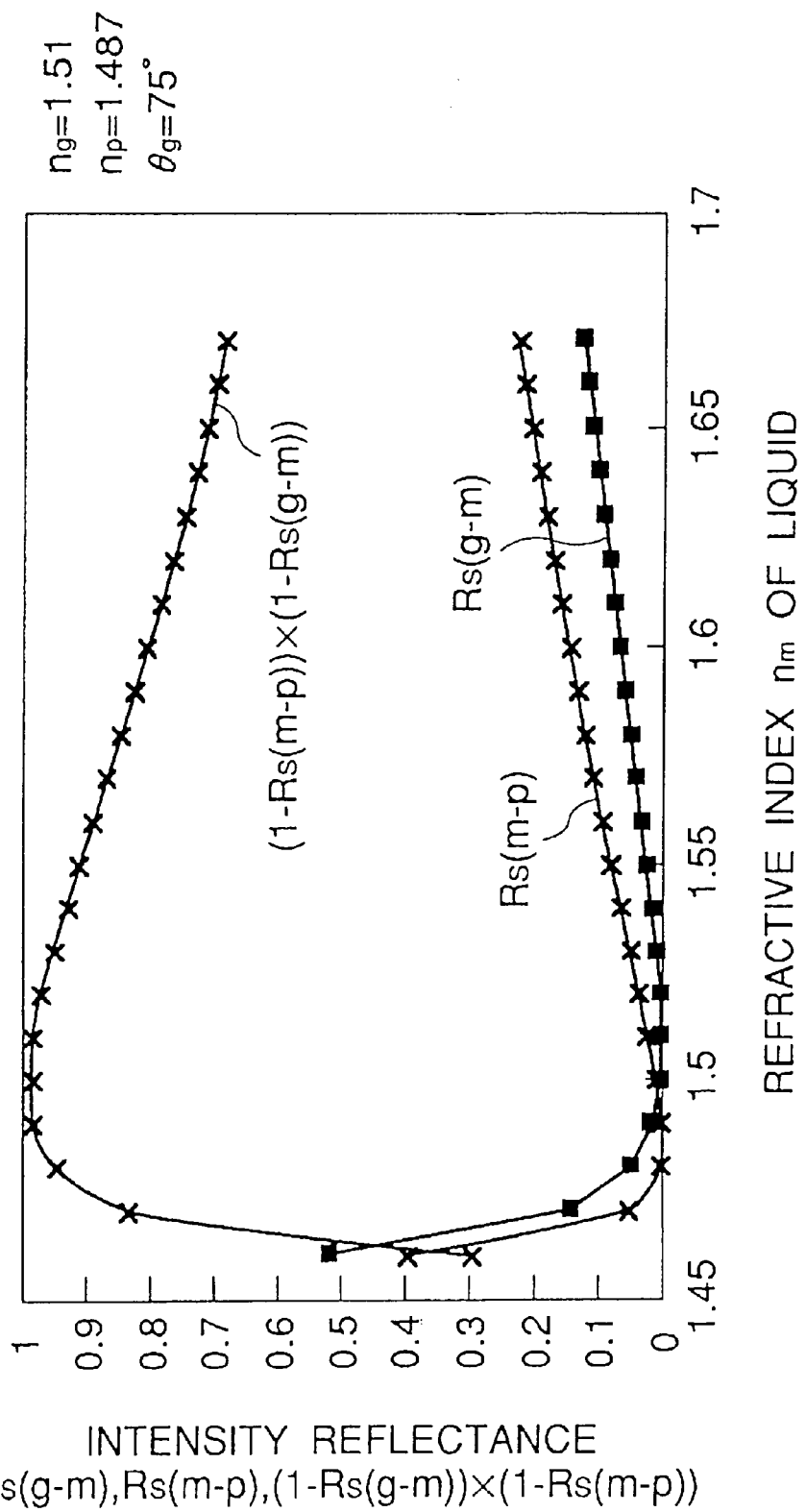
FIG. 19 is a graph showing a relationship between the intensity reflectance and the refractive index of the liquid in a case where $\theta_g=75°$.
Figure 20:
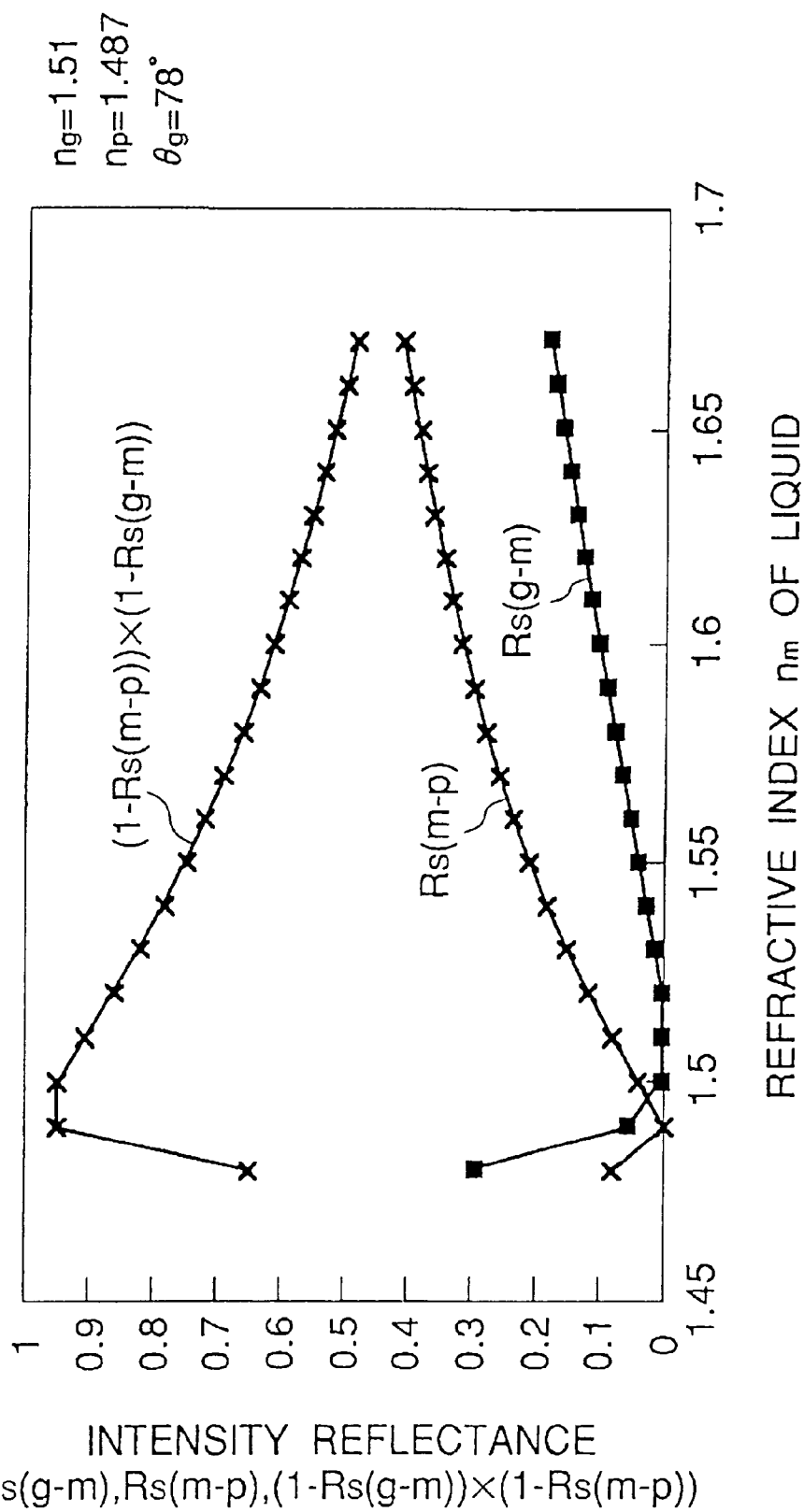
FIG. 20 is a graph showing a relationship between the intensity reflectance and the refractive index of the liquid in a case where $\theta_g=78°$.

FIGS. 19 and 20 show results of simulations in which values of $Rs_{(g-m)}$, $Rs_{(m-p)}$, and $(1-Rs_{(g-m)}) \times (1-Rs_{(m-p)})$ were calculated while varying $n_m$ with an assumption that $n_p = 1.487$, $n_g = 1.51$, and $\theta_g = 75°$ or $78°$.

The ranges of $n_m$ where the value of $(1-Rs_{(g-m)}) \times (1-Rs_{(m-p)})$ is 0.9 or more are expressed by Inequalities (12) and (13) below.

$$\text{When } \theta_g = 75°, \, 1.475 < n_m < 1.549 \quad (12)$$

$$\text{When } \theta_g = 78°, \, 1.486 < n_m < 1.514 \quad (13)$$

In the above simulations, the refractive index of the photopolymer layer 130B is employed as the refractive index $n_p$ of the hologram recording medium 130. However, in the hologram recording medium 130 that is actually used, as shown in FIG. 13, the photopolymer layer 130B is interposed between the film base 130A and the cover sheet 130C and hence the photopolymer layer 130B is not in direct contact with the liquid 170. Therefore, if the refractive index of the film base 130A or the cover sheet 130C that exists between the photopolymer layer 130B and the liquid 170 is not equal to that of the photopolymer layer 130B or the liquid 170, the above ranges of $n_m$ have deviations.

7. Color Holographic Stereogram

According to the invention, a color holographic stereogram can easily be produced. For example, in the above holographic stereogram printer 103, the color of a reproduction image can be adjusted by moving the cylindrical Fresnel lens 144, which is an optical part having a focusing function in the non-parallax direction, by a proper distance in the non-parallax direction. By utilizing this phenomenon, a color holographic stereogram can be produced according to the same principle as a rainbow hologram is produced.

In producing a color holographic stereogram, first, three holographic stereograms corresponding to the three respective primary colors of light are produced while the focal point of an object beam applied to the hologram recording medium 130 is changed for each holographic stereogram.

That is, a holographic stereogram for the red component is produced by disposing the cylindrical Fresnel lens 144 having a focusing function only in the non-parallax direction at a position where a red reproduction image is obtained. Similarly, a holographic stereogram for the green component is produced by disposing the cylindrical Fresnel lens 144 at a position where a green reproduction image is obtained, and a holographic stereogram for the blue component is produced by disposing the cylindrical Fresnel lens 144 at a position where a blue reproduction image is obtained.

In this manner, respective holographic stereograms that will produce red, green, and blue reproduction images are produced while changing the position of the cylindrical Fresnel lens 144, which has focusing function only in the non-parallax direction.

After the three holographic stereograms corresponding to the three primary colors of light are produced in the above manner, they are laid one on another and stuck to each other. A holographic stereogram capable of producing a color reproduction image is thus obtained.

Figure 21:
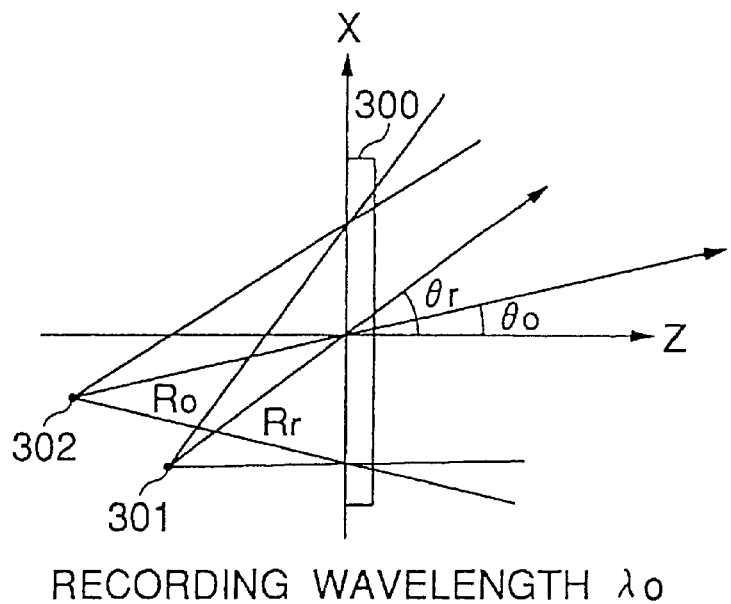
FIG. 21 shows a positional relationship between a reference light source and an object light source in recording.
Figure 22:
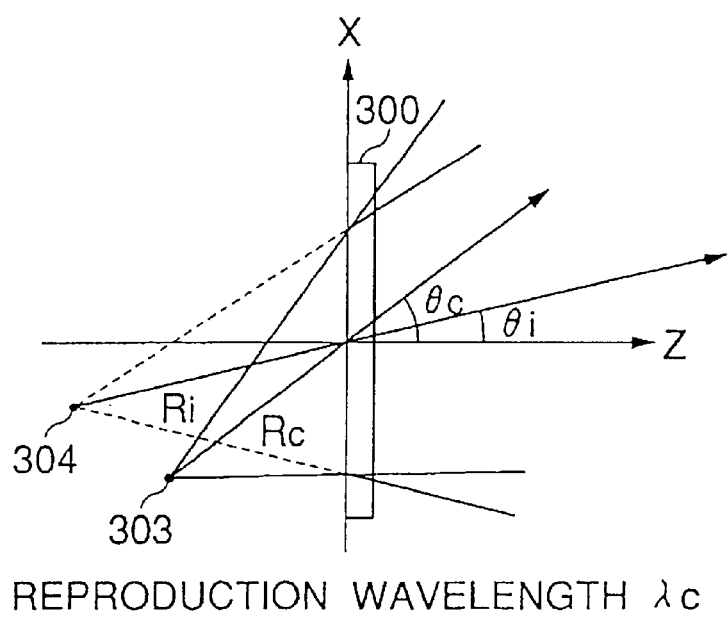
FIG. 22 shows a positional relationship between a reproduction illumination light source and a reproduction image in reproduction.

Incidentally, if reproduction of a holographic stereogram is performed by a beam having the same wavelength as in the recording optical system, a reproduction image is generated at the position of the original object. However, if the wavelength of a beam used in reproduction is different than used in recording, the position of a reproduction image is different from that of the original object. Assume that a holographic stereogram 300 is produced through interference between a reference beam from a reference light source point 301 and an object beam from an object light source point 302 as shown in FIG. 21, and that reproduction of the holographic stereogram 300 is performed by a reproduction illumination beam from a reproduction illumination light source point 303 that is located at the same position as the reference light source point 301 as shown in FIG. 22. In this case, the position of a reproduction image point 304 is expressed by Equations (14) and (15).

$$1/R_i = 1/R_c + \mu(1/R_o - 1/R_r) \quad (14)$$

$$\sin \theta_i = \sin \theta_c + \mu(\sin \theta_o - \sin \theta_r) \quad (15)$$

As shown in FIGS. 21 and 22, the X and Y axes are set in a surface of the holographic stereogram 300 and the Z axis is set perpendicularly to this surface. It is assumed that the light sources of a reference beam, an object beam, and a reproduction illumination beam are point light sources and exist in the X-Z plane.

In Equations (14) and (15), R is a distance from each light source to the center of the holographic stereogram 300, $\theta$ is an angle of each beam, and suffixes r, o, c, and i represent a reference beam, an object beam, a reproduction illumination beam, and a reproduction beam, respectively. Further, $\mu$ is a ratio of a wavelength $\lambda_c$ of reproduction to a wavelength $\lambda_o$ of recording and is given by Equation (16).

$$\mu = \lambda_c / \lambda_o \quad (16)$$

As is understood from Equations (14)–(16), the position of the reproduction image point 304 depends on the wavelengths of beams used in recording and reproduction. Therefore, in producing a holographic stereogram capable of producing a color reproduction image by laying three holographic stereograms one on another as described above, it is necessary to consider the above variation in the position of the reproduction image point 304 so that reproduction images of the respective holographic stereograms are properly superimposed one on another.

For example, where the wavelength $\lambda_o$ of a laser beam used in image recording is 532 nm and the wavelengths $\lambda_c$ of beams used in image reproduction are 470 nm (blue), 532 nm (green), and 610 nm (red), holographic stereograms corresponding to the three primary colors of light are produced in the following manner. It is assumed that the incident angle of a reference beam is 75° and the distance between a holographic stereogram and a viewing point in viewing a reproduction image is 300 mm.

First, in producing a holographic stereogram corresponding to the green component, since the recording wavelength $\lambda_o$ is equal to the reproduction wavelength $\lambda_c$, the converging point of the cylindrical Fresnel lens 144 is set at the position where the pupils will be located in viewing a holographic stereogram. That is, in recording a green-component image, the center of the cylindrical Fresnel lens 144 may be aligned with the center of the hologram recording medium 130.

On the other hand, in producing holographic stereograms corresponding to the blue and red components, since the recording wavelength $\lambda_o$ is not equal to the reproduction wavelength $\lambda_c$, the position of the reproduction image point 304 is changed. Therefore, in producing holographic stereograms corresponding to the blue and red components, it is necessary to consider the change in the position of the reproduction image point 304.

In producing a holographic stereogram corresponding to the blue component, $\lambda_o$=532 nm, $\lambda_c$=470 nm, $\theta_i$=0°, $\theta_c$=−75°, and $\theta_r$=−75°. In this case, $\theta_o$ is calculated as 7.32° from Equation (15).

Therefore, to allow a reproduction image of a holographic stereogram corresponding to the blue component to be properly superimposed on that of the above-produced holographic stereogram corresponding to green component, it is necessary to deviate in advance the position of the object light source point 302 by 7.32° and to cause an object beam to converge on the hologram recording medium 130 in producing a holographic stereogram corresponding to the blue component.

Figure 23:
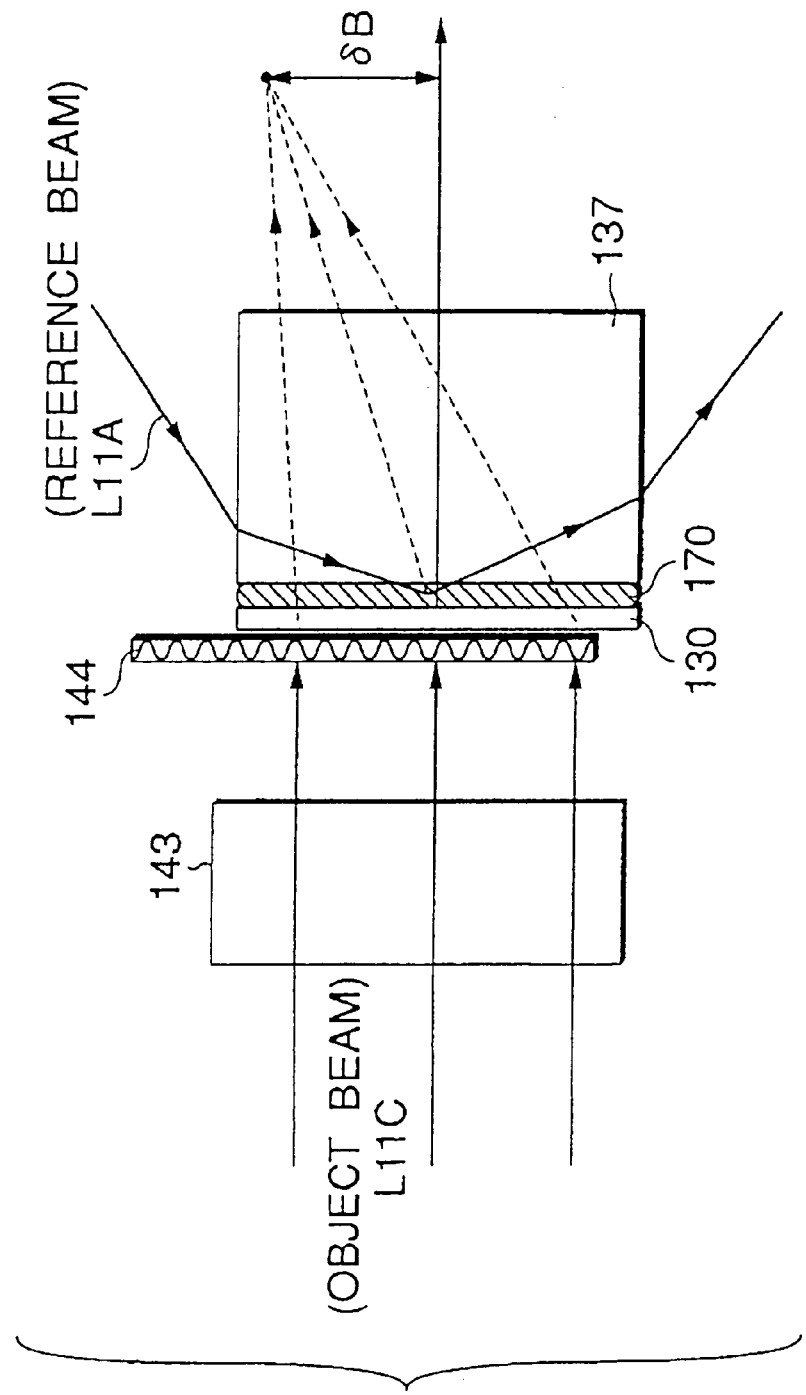
FIG. 23 shows a state that the center of a cylindrical Fresnel lens is deviated from the center of the hologram recording medium.

To converge an object beam with its incident angle changed, the center of the cylindrical Fresnel lens 144 may be deviated from the center of the hologram recording medium 130 as shown in FIG. 23, for instance. In the example of FIG. 23, the center of the cylindrical lens 144 is deviated upward with respect to the center of the hologram recording medium 130. A deviation distance δB may be set at 300 mm×tan 7.32°=38.5 mm.

Similarly, in producing a holographic stereogram corresponding to the red component, a reproduction image of a holographic stereogram corresponding to the red component can properly be superimposed on reproduction images of the above-produced holographic stereograms corresponding to the green and blue components by deviating the cylindrical Fresnel lens 144. A deviation distance δB at this time can be calculated in the same manner as in the above calculation for the holographic stereogram corresponding to the blue component. The deviation distance δB is calculated as 37.32 mm.

As described above, by deviating the position of the cylindrical Fresnel lens 144, which is an optical member having a focusing function only in the non-parallax direction in producing holographic stereograms corresponding to the blue and red components, three reproduction images corresponding to the three primary colors of light can be obtained at the same position. A holographic stereogram capable of producing a color reproduction image can be produced by producing three holographic stereograms corresponding to the three primary colors of light in the above manner and then laying them together and sticking those to each other as described above.

As seen from Equation (14), if the recording wavelength $\lambda_o$ and the reproduction wavelength $\lambda_c$ are different from each other, not only the angle of a reproduction image point but also the distance from a holographic stereogram to a reproduction image point is changed. The above description did not refer to this effect. This effect is known as occurrence of an achromatic angle. Therefore, to equalize the three reproduction image points strictly, it is necessary to correct the angle of a converging point but also the distance from a holographic stereogram to a reproduction image point. This can be done by, for instance, making a reference beam a non-parallel beam. However, in practice, a holographic stereogram having sufficient image quality can be obtained even without making such a correction. That is, a color holographic stereogram having sufficient image quality for practical use can be obtained by the colorization technique in which the only correction is to move the position of the cylindrical Fresnel lens 144 in the above-described manner.

The above description is directed to the case where a color holographic stereogram is obtained by producing respective holographic stereograms corresponding to the green, blue, and red components while changing the position of the cylindrical Fresnel lens 144, which is an optical part having a focusing function only in the non-parallax direction, and then laying those holographic stereograms one on another. However, the method of producing a color holographic stereogram is not limited to this method.

For example, a color holographic stereogram can be produced by performing three exposing operations corresponding to the three primary colors of light in forming each elemental hologram to create the color holographic stereogram.

For example, this is done in the following manner. First, the hologram recording medium 130 is exposed so that an elemental hologram corresponding to the red component is formed. Then, the hologram recording medium 130 is exposed so that an elemental hologram corresponding to the green component is formed at the same position. Then, the hologram recording medium 130 is exposed so that an elemental hologram corresponding to the blue component is formed at the same position.

In each exposing operation, the focal point of an object beam is moved in the non-parallax direction so that reproduction images of the red, green, and blue components are obtained at the same position. For example, this is done by changing, in each exposing operation, the position of the cylindrical Fresnel lens 144, which is an optical part having a focusing function only in the non-parallax direction, in the same manner as in the above example.

By performing multiple exposure for each elemental hologram in the above-described manner, each, elemental hologram becomes a rainbow hologram capable of producing a color reproduction image. A holographic stereogram constituted of such elemental holograms serves, as a whole, as a color holographic stereogram.

A color holographic stereogram can also be produced by constructing a holographic stereogram from elemental holograms corresponding to the red component, elemental holograms corresponding to the green component, and elemental holograms corresponding to the blue component.

That is, a red component elemental hologram corresponding to the red component of an image to be recorded, a green component elemental hologram corresponding to the green component of the image to be recorded, and a blue component elemental hologram corresponding to the blue component of the image to be recorded are formed as separate elemental holograms that together create a holographic stereogram.

For example, this is done in the following manner. First, a red component elemental hologram is formed on the hologram recording medium 130. Then, a green component elemental hologram is formed adjacent to the red component elemental hologram, and a blue component elemental hologram is formed adjacent to the green component elemental hologram. The above operations of forming a red component elemental hologram, a green component elemental hologram, and a blue component elemental hologram are repeated.

The focal point of an object beam that is applied to the hologram recording medium 130 is changed each time a red component, green component, or blue component elemental hologram is formed so that reproduction images of red component, green component, and blue component elemental holograms are obtained at the same position. For example, this is done by changing, in each exposing operation, the position of the cylindrical Fresnel lens 144 which is an optical part having a focusing function only in the non-parallax direction in the same manner as in the above example.

A holographic stereogram capable of producing, as a while, a color reproduction image can be produced by sequentially forming red component elemental holograms, blue component elemental holograms, and green component elemental holograms on a single hologram recording medium.

8. Other Embodiments

Although the above description is directed to the case of using the cylindrical Fresnel lens as an optical member for focusing an object beam in the non-parallax direction, this optical member may be a member other than the cylindrical Fresnel lens as long as it can focus an object beam in the non-parallax direction.

Figure 24:
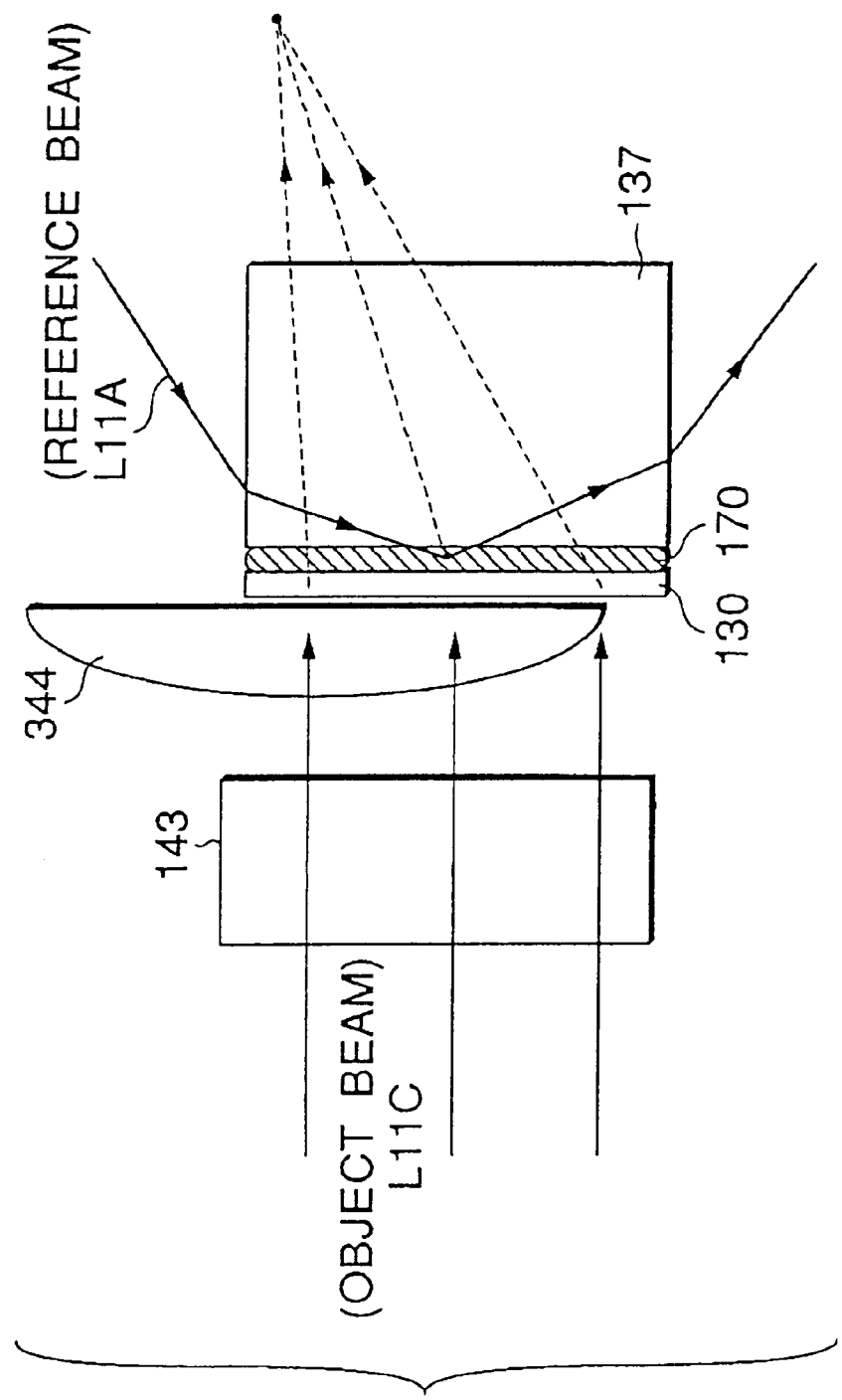
FIG. 24 shows an example in which a cylindrical lens is used as an optical member for focusing an object beam in the non-parallax direction.

For example, a cylindrical lens 344 may be used as shown in FIG. 24, or a hologram lens that converges a beam by using a hologram may be used. However, the cylindrical lens 344 as shown in FIG. 24 causes aberrations in the focusing in the parallax direction due to influences of the lens thickness. Therefore, the above-described cylindrical Fresnel lens 144 is more suitable for the optical member for focusing an object beam in the non-parallax direction than the cylindrical lens 344.

If an object beam to be input to the hologram recording medium 130 is sufficiently focused in the parallax direction when it reaches the surface of the hologram recording medium 130, rather than an optical member that focuses an object beam only in the non-parallax direction, an ordinary convex lens may be used as an optical member for focusing an object beam in the non-parallax direction.

Figure 25:
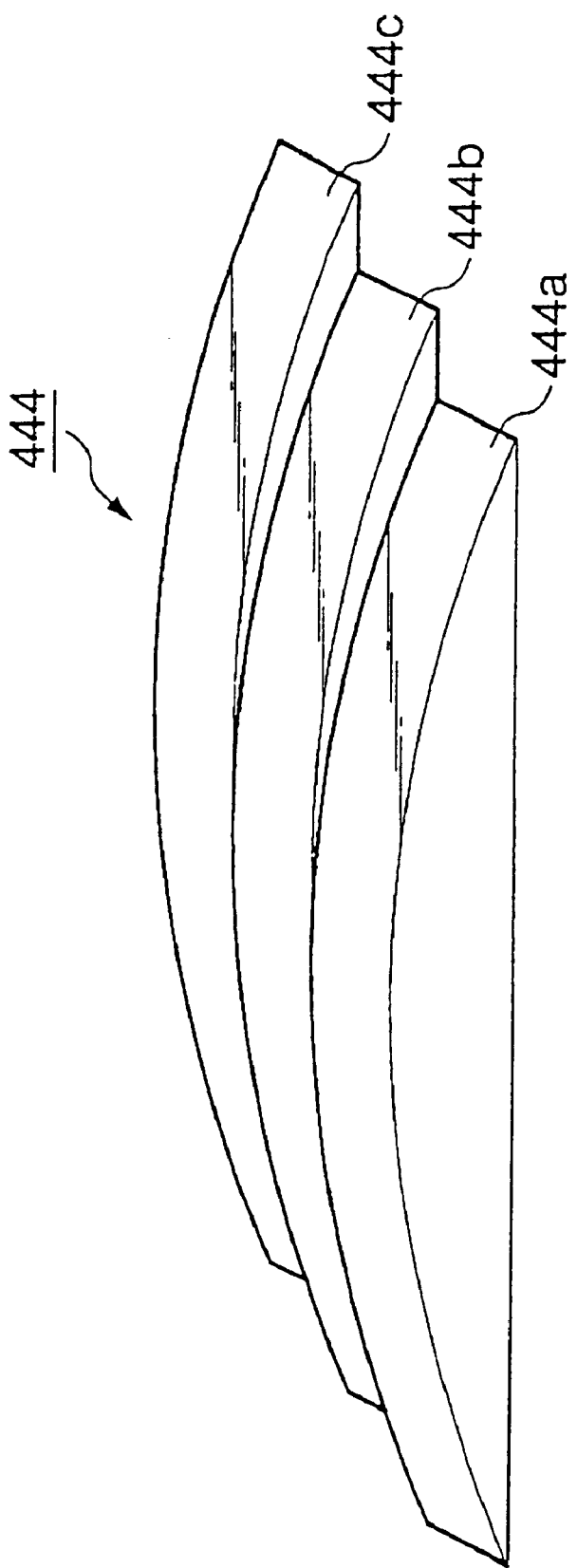
FIG. 25 shows an optical member in which three cylindrical lenses are combined into a monolithic part.

In forming a color holographic stereogram, an optical member 444 as shown in FIG. 25 may be used as an optical member for focusing an object beam in the non-parallax direction. The optical member 444 is constructed in such a manner that first, second, and third cylindrical lenses 444a–444c are combined into a monolithic part while deviating their center positions from each other. The deviation distances of the center positions of the respective cylindrical lenses 444a–444c are set so as to correspond to the above-mentioned deviation distances δB.

In producing a color holographic stereogram by using the optical member 444, the optical member 444 is moved parallel with the parallax direction so that the cylindrical lens to which an object beam is input is switched each time an elemental hologram is formed to produce a red, green, or blue reproduction image.

For example, in forming an elemental hologram for producing a red reproduction image, the optical member 444 is moved parallel with the parallax direction so that an object beam is input to the first cylindrical lens 444a. Similarly, in forming an elemental hologram for producing a green reproduction image, the optical member 444 is moved parallel with the parallax direction so that an object beam is input to the second cylindrical lens 444b; and in forming an elemental hologram for producing a blue reproduction image, the optical member 444 is moved parallel with the parallax direction so that an object beam is input to the third cylindrical lens 444c.

Where the optical member 444 is used, a constant deviation distance 6B can always be obtained merely by moving the optical member 444 parallel with the parallax direction. Therefore, the error of the deviation distance SB becomes very small. Further, where the optical member 444 is used, the movement distances of the optical member 444 can be made small, which is advantageous in miniaturizing the apparatus.

Although to facilitate understanding FIG. 25 is drawn in such a manner that the optical member 444 is composed of three cylindrical lenses, it goes without saying that three cylindrical Fresnel lenses may be combined in the same manner. The use of cylindrical Fresnel lenses is even preferable because the aberrations due to influences of the lens thickness are small as described above.

Figure 26:
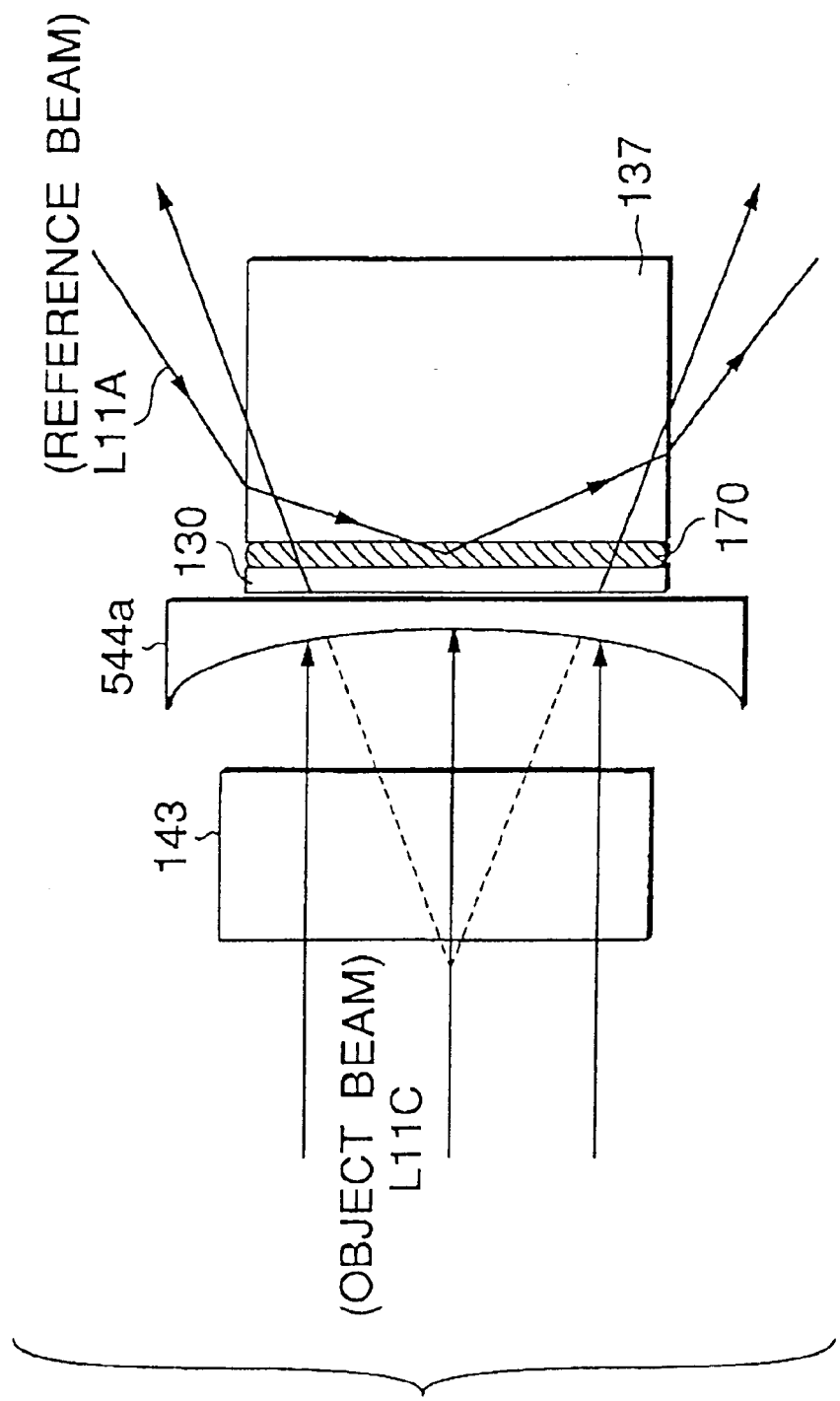
FIG. 26 shows an example of configuration in which a cylindrical lens used as an optical member for diverging an object beam in the non-parallax direction.

Although the above description is directed to the case where an object beam is input to the hologram recording medium 130 after being given focusing action in the non-parallax direction, an alternative configuration is possible in which an object beam L11C is input to the hologram recording medium 130 after being given diverging action in the non-parallax direction as shown in FIGS. 26 and 27 and conjugate beam reproduction is performed. The latter configuration can produce a rainbow-type holographic stereogram as in the case of the above-described holographic stereogram.

For example, the optical member for diverging an object beam in the non-parallax direction may be either a concave cylindrical lens 544a having a function of diverging an object beam L11C (see FIG. 26) or a cylindrical Fresnel lens 544b having a function of diverging an object beam L11C (see FIG. 27).

As is apparent from the above description, according to the invention, an edge-lit, rainbow-type holographic stereogram can be manufactured easily. Further, according to the invention, a color holographic stereogram can be manufactured easily.

What is claimed is:

1. An image recording apparatus comprising:

an optical member for focusing or diverging an object beam in a non-parallax direction of a holographic stereogram to be formed; and a light introduction block in optical contact with a hologram recording medium, wherein a holographic stereogram is produced by forming a plurality of elemental holograms, each elemental hologram being formed by exposing the hologram recording medium such that the object beam focused or diverged by the optical member is applied to one surface of the hologram recording medium while a reference beam is applied to the other surface of the hologram recording medium via the light introduction block.

2. The image recording apparatus according to claim 1, wherein a focal point of the optical member can be moved in the non-parallax direction.

3. The image recording apparatus according to claim 2, wherein multiple exposure is performed to form each of the elemental holograms, and the focal point of the optical member is moved in the non-parallax direction in each exposing operation of the multiple exposure.

4. The image recording apparatus according to claim 3, wherein three exposing operations corresponding to three primary colors of light, respectively, are performed in the multiple exposure.

5. The image recording apparatus according to claim 2, wherein the optical member includes a plurality of lenses, and wherein the focal point of the optical member is moved by moving the optical member to switch a lens to which the object beam is input.

6. An image recording method for producing a holographic stereogram, comprising the steps of:

applying an object beam that has been focused or diverged in a non-parallax direction of a holographic stereogram to be formed to one surface of a hologram recording medium; and applying a reference beam to the other surface of the hologram recording medium via a light introduction block that is in optical contact with the hologram recording medium, wherein the applying steps form each of a plurality of elemental holograms forming the holographic stereogram.

7. The image recording method according to claim 6, wherein multiple exposure is performed to form each of the elemental holograms, and a focal point of the optical member is moved in the non-parallax direction in each exposing operation of the multiple exposure.

8. The image recording method according to claim 7, wherein three exposing operations corresponding to three primary colors of light, respectively, are performed in the multiple exposure.

9. The image recording method according to claim 6, wherein three holographic stereograms corresponding to three primary colors of light, respectively, are produced while a focal point of the object beam that is applied to the hologram recording medium is changed for each of the three holographic stereograms, and a color holographic stereogram is produced by sticking the three holographic stereograms to each other.

10. The image recording method according to claim 6, wherein a red component elemental hologram, a green component elemental hologram, and a blue component elemental hologram corresponding to red, green, and blue components of an image to be recorded, respectively, are formed as each of the elemental holograms, and wherein a color holographic stereogram is produced while a focal point of the object beam that is applied to the hologram recording medium is changed each time the red component elemental hologram, the green component elemental hologram, or the blue component elemental hologram is formed.

11. An image recording apparatus comprising:

an optical member provided on the side of one surface of a hologram recording medium, for focusing or diverging an object beam in a non-parallax direction of a holographic stereogram to be formed;

a light introduction block in optical contact with the other surface of the hologram recording medium;

a laser; and a half mirror for branching a beam that is emitted from the laser into first and second beams, wherein a holographic stereogram is produced by forming a plurality of elemental holograms, each elemental hologram being formed by exposing the hologram recording medium such that the first beam is applied to one surface of the hologram recording medium while the second beam is applied to the other surface of the hologram recording medium via the light introduction block.

12. The image recording apparatus according to claim 1, wherein the hologram recording medium is in optical contact with the light introduction block via an index matching liquid.

13. The image recording method according to claim 6, wherein the hologram recording medium is in optical contact with the light introduction block via an index matching liquid.

14. The image recording apparatus according to claim 11, wherein the hologram recording medium is in optical contact with the light introduction block via an index matching liquid.

* * * * *